(12) United States Patent
Wagner et al.

(10) Patent No.: US 11,390,459 B2
(45) Date of Patent: Jul. 19, 2022

(54) SYSTEMS AND METHODS FOR PROCESSING OBJECTS INCLUDING MOBILE MATRIX CARRIER SYSTEMS

(71) Applicant: Berkshire Grey Operating Company, Inc., Bedford, MA (US)

(72) Inventors: Thomas Wagner, Concord, MA (US); Kevin Ahearn, Fort Mill, SC (US); John Richard Amend, Jr., Belmont, MA (US); Benjamin Cohen, Somerville, MA (US); Michael Dawson-Haggerty, Pittsburgh, PA (US); William Hartman Fort, Stratham, NH (US); Christopher Geyer, Arlington, MA (US); Jennifer Eileen King, Oakmont, PA (US); Thomas Koletschka, Cambridge, MA (US); Michael Cap Koval, Mountain View, CA (US); Kyle Maroney, North Attleboro, MA (US); Matthew T. Mason, Pittsburgh, PA (US); William Chu-Hyon McMahan, Cambridge, MA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 0 days.

(21) Appl. No.: 16/993,364

(22) Filed: Aug. 14, 2020

(65) Prior Publication Data

US 2020/0369470 A1    Nov. 26, 2020

Related U.S. Application Data

(63) Continuation of application No. 15/926,497, filed on Mar. 20, 2018, now Pat. No. 10,807,795.
(Continued)

(51) Int. Cl.
*B65G 1/02* (2006.01)
*B65G 65/00* (2006.01)
(Continued)

(52) U.S. Cl.
CPC ............ *B65G 1/02* (2013.01); *B65G 1/0492* (2013.01); *B65G 1/1378* (2013.01); *B65G 65/005* (2013.01); *B65G 2209/04* (2013.01)

(58) Field of Classification Search
CPC combination set(s) only.
See application file for complete search history.

(56) References Cited

U.S. PATENT DOCUMENTS

| 1,030,320 | A | 6/1912 | Morgan |
| 2,294,945 | A | 9/1942 | Zink |

(Continued)

FOREIGN PATENT DOCUMENTS

| AU | 2006204622 A1 | 3/2007 |
| CA | 2795022 A1 | 10/2011 |

(Continued)

OTHER PUBLICATIONS

Notice on the First Office Action and First Office Action, along with its English translation, issued by the China National Intellectual Property Administration issued in related Chinese Patent Application No. 20880032530.0 dated Sep. 29, 2020, 23 pages.
(Continued)

*Primary Examiner* — Kyle O Logan
(74) *Attorney, Agent, or Firm* — Gesmer Updegrove LLP

(57) ABSTRACT

A storage, retrieval and processing system for processing objects is disclosed. The storage, retrieval and processing
(Continued)

system includes a plurality of storage bins providing storage of a plurality of objects, where the plurality of storage bins is in communication with a bin conveyance system for moving selected storage bins to a storage bin processing location, a programmable motion device in communication with the bin processing location for receiving a selected storage bin from the plurality of bins, where the programmable motion device includes an end effector for grasping and moving a selected object out of a selected storage bin, and a plurality of destination bins in communication with the bin conveyance system for moving a selected destination bin from a destination bin processing location that is proximate the programmable motion device to the plurality of destination bins.

32 Claims, 25 Drawing Sheets

Related U.S. Application Data

(60) Provisional application No. 62/578,030, filed on Oct. 27, 2017, provisional application No. 62/473,790, filed on Mar. 20, 2017.

(51) Int. Cl.
  *B65G 1/137* (2006.01)
  *B65G 1/04* (2006.01)

(56) References Cited

U.S. PATENT DOCUMENTS

| | | | |
|---|---|---|---|
| 3,223,259 A | 12/1965 | Nicholson | |
| 4,114,762 A | 9/1978 | Beal et al. | |
| 4,678,390 A | 7/1987 | Bonneton et al. | |
| 4,722,653 A | 2/1988 | Williams et al. | |
| 4,759,439 A | 7/1988 | Hartlepp | |
| 4,846,335 A | 7/1989 | Hartlepp | |
| 4,846,619 A | 7/1989 | Crabtree et al. | |
| 4,895,242 A | 1/1990 | Michel | |
| 5,190,162 A | 3/1993 | Hartlepp | |
| 5,393,074 A | 2/1995 | Bear et al. | |
| 5,525,884 A | 6/1996 | Sugiura et al. | |
| 5,595,263 A | 1/1997 | Pignataro | |
| 5,839,566 A | 11/1998 | Bonnet | |
| 6,011,998 A | 1/2000 | Lichti et al. | |
| 6,036,812 A | 3/2000 | Williams et al. | |
| 6,059,092 A | 5/2000 | Jerue et al. | |
| 6,079,570 A | 6/2000 | Oppliger et al. | |
| 6,208,908 B1 | 3/2001 | Boyd et al. | |
| 6,246,023 B1 | 6/2001 | Kugle | |
| 6,323,452 B1 | 11/2001 | Bonnet | |
| 6,377,867 B1 | 4/2002 | Bradley et al. | |
| 6,390,756 B1 | 5/2002 | Isaacs et al. | |
| 6,505,093 B1 | 1/2003 | Thatcher et al. | |
| 6,543,983 B1 | 4/2003 | Felder et al. | |
| 6,579,053 B1 | 6/2003 | Grams et al. | |
| 6,685,031 B2 | 2/2004 | Takizawa | |
| 6,688,459 B1 | 2/2004 | Bonham et al. | |
| 6,762,382 B1 | 7/2004 | Danelski | |
| 6,897,395 B2 | 5/2005 | Shiibashi et al. | |
| 6,946,612 B2 | 9/2005 | Morikawa | |
| 6,997,666 B1 | 2/2006 | Rodgers et al. | |
| 7,728,244 B2 | 6/2010 | DeLeo et al. | |
| 7,861,844 B2 | 1/2011 | Hayduchok et al. | |
| 8,718,814 B1 | 5/2014 | Clark et al. | |
| 8,776,694 B2 | 7/2014 | Rosenwinkel et al. | |
| 8,798,784 B1 | 8/2014 | Clark et al. | |
| 8,831,984 B2 | 9/2014 | Hoffman et al. | |
| 8,911,199 B2 | 12/2014 | Hermann et al. | |
| 8,952,284 B1 | 2/2015 | Wong et al. | |
| 8,972,045 B1* | 3/2015 | Mountz | B65G 1/1373 |
| | | | 700/216 |
| 8,989,918 B2 | 3/2015 | Sturm | |
| 8,997,438 B1 | 4/2015 | Fallas | |
| 9,020,632 B2 | 4/2015 | Naylor | |
| 9,102,336 B2 | 8/2015 | Rosenwinkel | |
| 9,111,251 B1* | 8/2015 | Brazeau | G06Q 10/087 |
| 9,120,622 B1 | 9/2015 | Elazary et al. | |
| 9,216,857 B1* | 12/2015 | Kalyan | G06Q 10/087 |
| 9,227,323 B1 | 1/2016 | Konolige et al. | |
| 9,346,083 B2 | 5/2016 | Stone | |
| 9,364,865 B2 | 6/2016 | Kim | |
| 9,481,518 B2 | 11/2016 | Neiser | |
| 9,492,923 B2 | 11/2016 | Wellman et al. | |
| 9,517,899 B2 | 12/2016 | Watt et al. | |
| 9,688,471 B2 | 6/2017 | Hellenbrand | |
| 9,694,977 B2 | 7/2017 | Aprea et al. | |
| 9,751,693 B1 | 9/2017 | Battles et al. | |
| 9,821,464 B2 | 11/2017 | Stiernagle et al. | |
| 9,878,349 B2 | 1/2018 | Crest et al. | |
| 9,926,138 B1 | 3/2018 | Brazeau et al. | |
| 9,975,148 B2 | 5/2018 | Zhu et al. | |
| 10,029,865 B1 | 7/2018 | McCalib, Jr. et al. | |
| 10,576,621 B2 | 3/2020 | Wagner et al. | |
| 10,611,021 B2 | 4/2020 | Wagner et al. | |
| 10,625,934 B2 | 4/2020 | Mallady | |
| 10,857,925 B1 | 12/2020 | Sahota | |
| 2002/0092801 A1 | 7/2002 | Dominguez | |
| 2002/0157919 A1* | 10/2002 | Sherwin | B65G 47/52 |
| | | | 198/370.01 |
| 2005/0002772 A1 | 1/2005 | Stone | |
| 2005/0137933 A1 | 6/2005 | Holsen et al. | |
| 2005/0220600 A1 | 10/2005 | Baker et al. | |
| 2006/0045672 A1 | 3/2006 | Maynard et al. | |
| 2007/0209976 A1 | 9/2007 | Worth et al. | |
| 2008/0181753 A1 | 7/2008 | Bastian et al. | |
| 2008/0269960 A1 | 10/2008 | Kostmann | |
| 2009/0026017 A1 | 1/2009 | Freudelsperger | |
| 2009/0074545 A1* | 3/2009 | Lert, Jr. | B65G 1/0492 |
| | | | 414/276 |
| 2010/0122942 A1 | 5/2010 | Harres et al. | |
| 2011/0014021 A1 | 1/2011 | Reid et al. | |
| 2011/0144798 A1 | 6/2011 | Freudelsperger | |
| 2011/0238207 A1 | 9/2011 | Bastian, II et al. | |
| 2011/0243707 A1 | 10/2011 | Dumas et al. | |
| 2012/0128454 A1 | 5/2012 | Hayduchok et al. | |
| 2012/0259482 A1 | 10/2012 | Jeschke | |
| 2013/0110280 A1* | 5/2013 | Folk | B25J 9/1697 |
| | | | 700/215 |
| 2013/0334158 A1 | 12/2013 | Koch | |
| 2014/0058556 A1 | 2/2014 | Kawano | |
| 2014/0086709 A1 | 3/2014 | Kasai | |
| 2014/0086714 A1 | 3/2014 | Malik | |
| 2014/0100999 A1* | 4/2014 | Mountz | G06Q 10/087 |
| | | | 705/28 |
| 2014/0244026 A1* | 8/2014 | Neiser | B65G 1/1378 |
| | | | 700/216 |
| 2014/0277693 A1 | 9/2014 | Naylor | |
| 2015/0032252 A1 | 1/2015 | Galluzzo et al. | |
| 2015/0073589 A1 | 3/2015 | Khodl et al. | |
| 2015/0081090 A1 | 3/2015 | Dong | |
| 2015/0098775 A1 | 4/2015 | Razumov | |
| 2015/0114799 A1 | 4/2015 | Hansl et al. | |
| 2015/0259077 A1 | 9/2015 | Wiskus | |
| 2015/0375398 A1 | 12/2015 | Penn et al. | |
| 2016/0075521 A1 | 3/2016 | Puchwein et al. | |
| 2016/0167227 A1 | 6/2016 | Wellman et al. | |
| 2016/0176638 A1 | 6/2016 | Toebes | |
| 2016/0236867 A1 | 8/2016 | Brazeau et al. | |
| 2016/0244262 A1 | 8/2016 | O'Brien et al. | |
| 2016/0274586 A1 | 9/2016 | Stubbs et al. | |
| 2016/0325934 A1 | 11/2016 | Stiernagle et al. | |
| 2016/0347545 A1* | 12/2016 | Lindbo | B65G 61/00 |
| 2016/0355337 A1 | 12/2016 | Lert et al. | |
| 2017/0021499 A1 | 1/2017 | Wellman et al. | |
| 2017/0043953 A1 | 2/2017 | Battles et al. | |
| 2017/0080566 A1 | 3/2017 | Stubbs et al. | |
| 2017/0106532 A1 | 4/2017 | Wellman et al. | |
| 2017/0107055 A1 | 4/2017 | Magens et al. | |
| 2017/0121114 A1 | 5/2017 | Einav et al. | |
| 2017/0157648 A1 | 6/2017 | Wagner et al. | |

(56) References Cited

U.S. PATENT DOCUMENTS

| | | | |
|---|---|---|---|
| 2017/0225330 | A1 | 8/2017 | Wagner et al. |
| 2017/0305668 | A1 | 10/2017 | Bestic et al. |
| 2017/0305694 | A1 | 10/2017 | McMurrough et al. |
| 2017/0322561 | A1 | 11/2017 | Stiernagle |
| 2017/0349385 | A1 | 12/2017 | Moroni et al. |
| 2018/0085788 | A1 | 3/2018 | Engel et al. |
| 2018/0186572 | A1 | 7/2018 | Issing |
| 2018/0194571 | A1 | 7/2018 | Fryer et al. |
| 2018/0244473 | A1 | 8/2018 | Mathi et al. |
| 2018/0265298 | A1 | 9/2018 | Wagner et al. |
| 2018/0273297 | A1 | 9/2018 | Wagner et al. |
| 2018/0282066 | A1 | 10/2018 | Wagner et al. |
| 2018/0305122 | A1 | 10/2018 | Moulin et al. |
| 2018/0346022 | A1 | 12/2018 | Payeur |
| 2018/0354717 | A1 | 12/2018 | Lindbo et al. |
| 2019/0047786 | A1 | 2/2019 | Suzuki |
| 2019/0185267 | A1 | 6/2019 | Mattern et al. |
| 2020/0143127 | A1 | 5/2020 | Wagner et al. |
| 2020/0369470 | A1* | 11/2020 | Wagner ............ B65G 1/0492 |

FOREIGN PATENT DOCUMENTS

| | | | |
|---|---|---|---|
| CA | 2985166 | A | 12/2016 |
| CN | 1033604 | A | 7/1989 |
| CN | 1927673 | A | 3/2007 |
| CN | 102390701 | A | 3/2012 |
| CN | 104105641 | A | 10/2014 |
| CN | 204250465 | U | 4/2015 |
| CN | 105383906 | A | 3/2016 |
| CN | 105593143 | A | 5/2016 |
| CN | 105668255 | A | 6/2016 |
| CN | 105899398 | A | 8/2016 |
| CN | 106395225 | A | 2/2017 |
| CN | 106575391 | A | 4/2017 |
| CN | 106662874 | A | 5/2017 |
| CN | 206358714 | U | 7/2017 |
| CN | 107054960 | A | 8/2017 |
| CN | 107108122 | A | 8/2017 |
| CN | 107161215 | A | 9/2017 |
| DE | 957200 | C | 1/1957 |
| DE | 3124537 | C1 | 2/1983 |
| DE | 19510392 | A1 | 9/1996 |
| DE | 19633238 | A1 | 2/1998 |
| DE | 102008039764 | A1 | 5/2010 |
| DE | 102010002317 | A1 | 8/2011 |
| DE | 10009087 | A1 | 9/2013 |
| DE | 102012102333 | A1 | 9/2013 |
| DE | 102014111396 | A1 | 2/2016 |
| EP | 0235488 | A1 | 9/1987 |
| EP | 1695927 | A2 | 8/2006 |
| EP | 2062837 | A1 | 5/2009 |
| EP | 2308777 | A1 | 4/2011 |
| EP | 2477914 | B1 | 4/2013 |
| EP | 2650237 | A1 | 10/2013 |
| EP | 2745982 | A2 | 6/2014 |
| EP | 2937299 | A1 | 10/2015 |
| EP | 3112295 | A1 | 1/2017 |
| FR | 2036682 | A1 | 12/1970 |
| FR | 2174163 | A1 | 10/1973 |
| FR | 2832654 | A1 | 5/2003 |
| GB | 2085389 | A | 4/1982 |
| GB | 2539562 | A | 12/2016 |
| JP | S54131278 | A | 10/1979 |
| JP | S63310406 | A | 12/1988 |
| JP | H0395001 | A | 4/1991 |
| JP | H08157016 | A | 6/1996 |
| JP | 2003067053 | A | 3/2003 |
| JP | 2007182286 | A | 7/2007 |
| JP | 2008037567 | A | 2/2008 |
| JP | 2010202291 | A | 9/2010 |
| JP | 2014141313 | A | 8/2014 |
| NO | 20150758 | A1 | 12/2016 |
| WO | 03095339 | A1 | 11/2003 |
| WO | 2005118436 | A1 | 12/2005 |
| WO | 2007007354 | A1 | 1/2007 |
| WO | 2007009136 | A1 | 1/2007 |
| WO | 2008091733 | A1 | 7/2008 |
| WO | 2010017872 | A1 | 2/2010 |
| WO | 2011038442 | A2 | 4/2011 |
| WO | 2011128384 | A1 | 10/2011 |
| WO | 2012024714 | A2 | 1/2012 |
| WO | 2012127102 | A1 | 9/2012 |
| WO | 2014130937 | A1 | 8/2014 |
| WO | 2014166650 | A1 | 10/2014 |
| WO | 2015035300 | A1 | 3/2015 |
| WO | 2015118171 | A1 | 8/2015 |
| WO | 2015140216 | A1 | 9/2015 |
| WO | 2016198565 | A1 | 12/2016 |
| WO | 2017036780 | A1 | 3/2017 |
| WO | 2017064401 | A1 | 4/2017 |
| WO | 2017081281 | A1 | 5/2017 |
| WO | 2017148939 | A1 | 9/2017 |
| WO | 2017148963 | A1 | 9/2017 |
| WO | 2017150006 | A1 | 9/2017 |

OTHER PUBLICATIONS

Examiner's Report issued by the Innovation, Science and Economic Development Canada (Canadian Intellectual Property Office) in related Canadian Patent Application No. 3,076,514 dated May 28, 2021, 7 pages.

Notice on the First Office Action and First Office Action, along with its English translation, issued by the China National Intellectual Property Administration issued in related Chinese Patent Application No. 201880069627.9 dated Jan. 19, 2021, 12 pages.

Notice on the First Office Action and First Office Action, along with its English translation, issued by the China National Intellectual Property Administration issued in related Chinese Patent Application No. 201880069642.3 dated Mar. 3, 2021, 19 pages.

Notice on the Second Office Action and Second Office Action, along with its English translation, issued by the China National Intellectual Property Administration issued in related Chinese Patent Application No. 201880069627.9 dated Aug. 18, 2021, 16 pages.

Non-Final Office Action issued by the United States Patent and Trademark Office in related U.S. Appl. No. 16/739,670 dated Oct. 28, 2021, 28 pages.

Non-Final Office Action issued by the United States Patent and Trademark Office in related U.S. Appl. No. 16/172,353 dated Jan. 4, 2021, 12 pages.

Examiner's Report issued by the Innovation, Science and Economic Development Canada (Canadian Intellectual Property Office) in related Canadian Patent Application No. 3,080,514 dated Jun. 2, 2021, 4 pages.

Notice on the Second Office Action and the Second Office Action, along with its English translation, issued by the China National Intellectual Property Administration in related Chinese Patent Application No. 201880032609.3 dated Jun. 25, 2021, 7 pages.

Notice on the Third Office Action and Third Office Action, along with its English translation, issued by the China National Intellectual Property Administration issued in related Chinese Patent Application No. 201880019478.5 dated Sep. 7, 2021, 10 pages.

Examiner's Report issued by the Innovation, Science and Economic Development Canada in related Canadian Patent Application No. 3,057,313 dated Nov. 30, 2020, 3 pages.

Examiner's Report issued by the Innovation, Science and Economic Development Canada (Canadian Intellectual Property Office) in related Canadian Patent Application No. 3,076,511 dated May 5, 2021, 4 pages.

Notice on the Second Office Action and Second Office Action, along with its English translation, issued by the China National Intellectual Property Administration issued in related Chinese Patent Application No. 201880019478.5 dated Apr. 20, 2021, 9 pages.

First Office Action, and its English translation, issued by the China National Intellectual Property Administration issued in related Chinese Patent Application No. 201880019478.5 dated Aug. 25, 2020, 18 pages.

Non-Final Office Action issued by the United States Patent and Trademark Office in related U.S. Appl. No. 16/172,231 dated Apr. 22, 2021, 11 pages.

(56) References Cited

OTHER PUBLICATIONS

Examiner's Report issued by the Innovation, Science and Economic Development Canada in related Canadian Patent Application No. 3,057,367 dated Dec. 1, 2020, 3 pages.
Examiner's Report issued by the Innovation, Science and Economic Development Canada (Canadian Intellectual Property Office) in related Canadian Patent Application No. 3,056,892 dated Oct. 1, 2021, 4 pages.
Final Office Action issued by the United States Patent and Trademark Office in related U.S. Appl. No. 16/172,231 dated Jul. 29, 2021, 15 pages.
Notice on the First Office Action and First Office Action, along with its English translation, issued by the China National Intellectual Property Administration issued in related Chinese Patent Application No. 201880069649.5 dated Mar. 23, 2021, 23 pages.
Final Office Action issued by the United States Patent and Trademark Office in related U.S. Appl. No. 16/171,310 dated Sep. 30, 2020, 8 pages.
Notice on the First Office Action and First Office Action, along with its English translation, issued by the China National Intellectual Property Administration issued in related Chinese Patent Application No. 201880032609.3 dated Nov. 20, 2020, 20 pages.
Examiner's Report issued by the Innovation, Science and Economic Development Canada (Canadian Intellectual Property Office) in related Canadian Patent Application No. 3,080,616 dated Jun. 28, 2021, 5 pages.
Examiner's Report issued by the Innovation, Science and Economic Development Canada (Canadian Intellectual Property Office) in related Canadian Patent Application No. 3,080,615 dated Jun. 21, 2021, 4 pages.
Examiner's Report issued by the Innovation, Science and Economic Development Canada in related Canadian Patent Application No. 3,056,892 dated Dec. 14, 2020, 3 pages.
International Preliminary Report on Patentability issued by the International Bureau of WIPO in related International Application No. PCT/US2018/023339 dated Sep. 24, 2019, 7 pages.
International Search Report and Written Opinion of the International Search Authority, the European Patent Office, in related International Application No. PCT/US2018/023339 dated Jun. 18, 2018, 10 pages.
Communication pursuant to Rules 161(1) and 162 EPC issued by the European Patent Office dated Oct. 29, 2019 in related European Patent Application No. 18716070.0, 3 pages.
International Search Report and Written Opinion of the International Search Authority, the European Patent Office, in related International Application No. PCT/US2018/057600 dated Feb. 18, 2019, 10 pages.
International Search Report and Written Opinion of the International Search Authority, the European Patent Office, in related International Application No. PCT/US2018/057788 dated Feb. 18, 2018, 12 pages.
Partial International Search Report and Written Opinion of the International Search Authority, the European Patent Office, in related International Application No. PCT/US2018/057607 dated Feb. 11, 2018, 12 pages.
International Search Report and Written Opinion of the International Search Authority, the European Patent Office, in related International Application No. PCT/US2018/057607 dated Apr. 5, 2019, 16 pages.
International Search Report and Written Opinion of the International Search Authority, the European Patent Office, in related International Application No. PCT/US2018/057770 dated Feb. 18, 2019, 13 pages.
Partial International Search Report and Written Opinion of the International Search Authority, the European Patent Office, in related International Application No. PCT/US2018/057807 dated Feb. 18, 2019, 13 pages.
International Search Report and Written Opinion of the International Search Authority, the European Patent Office, in related International Application No. PCT/US2018/057807 dated Apr. 25, 2019, 16 pages.
Partial International Search Report and Written Opinion of the International Search Authority, the European Patent Office, in related International Application No. PCT/US2018/057795 dated Feb. 18, 2019, 14 pages.
International Search Report and Written Opinion of the International Search Authority, the European Patent Office, in related International Application No. PCT/US2018/057795 dated Apr. 12, 2019, 17 pages.
Non-Final Office Action issued by the U.S. Patent and Trademark Office in related U.S. Appl. No. 15/926,497 dated Jun. 10, 2019, 8 pages.
Non-Final Office Action issued by the U.S. Patent and Trademark Office in related U.S. Appl. No. 15/926,497 dated Dec. 11, 2019, 8 pages.
Non-Final Office Action issued by the U.S. Patent and Trademark Office in related U.S. Appl. No. 16/172,255 dated Apr. 1, 2020, 6 pages.
Non-Final Office Action issued by the U.S. Patent and Trademark Office in related U.S. Appl. No. 16/171,310 dated Jan. 9, 2020, 8 pages.
Non-Final Office Action issued by the U.S. Patent and Trademark Office in related U.S. Appl. No. 16/172,339 dated Mar. 30, 2020, 16 pages.
International Preliminary Report on Patentability issued by the International Bureau of WIPO in related International Application No. PCT/US2018/057600 dated Apr. 28, 2020, 7 pages.
International Preliminary Report on Patentability issued by the International Bureau of WIPO in related International Application No. PCT/US2018/057770 dated Apr. 28, 2020, 8 pages.
International Preliminary Report on Patentability issued by the International Bureau of WIPO in related International Application No. PCT/US2018/057607 dated Apr. 28, 2020, 11 pages.
International Preliminary Report on Patentability issued by the International Bureau of WIPO in related International Application No. PCT/US2018/057795 dated Apr. 28, 2020, 11 pages.
International Preliminary Report on Patentability issued by the International Bureau of WIPO in related International Application No. PCT/US2018/057807 dated Apr. 28, 2020, 11 pages.
International Preliminary Report on Patentability issued by the International Bureau of WIPO in related International Application No. PCT/US2018/057788 dated Apr. 28, 2020, 6 pages.
Communication pursuant to Rules 161(1) and 162 EPC issued by the European Patent Office in related European Patent Application No. 18807152.6 dated Jun. 4, 2020, 3 pages.
Communication pursuant to Rules 161(1) and 162 EPC issued by the European Patent Office in related European Patent Application No. 18804759.1 dated Jun. 4, 2020, 3 pages.
Communication pursuant to Rules 161(1) and 162 EPC issued by the European Patent Office in related European Patent Application No. 18807476.9 dated Jun. 4, 2020, 3 pages.
Communication pursuant to Rules 161(1) and 162 EPC issued by the European Patent Office in related European Patent Application No. 18807477.7 dated Jun. 4, 2020, 3 pages.
Communication pursuant to Rules 161(1) and 162 EPC issued by the European Patent Office in related European Patent Application No. 18807761.4 dated Jun. 5, 2020, 3 pages.
Communication pursuant to Rules 161(1) and 162 EPC issued by the European Patent Office in related European Patent Application No. 18804772.4 dated Jun. 4, 2020, 3 pages.
International Search Report and Written Opinion issued by the International Searching Authority, the European Patent Office, in related International Patent Application PCT/US2018/023836 dated Jun. 27, 2018, 12 pages.
U.S. Non-Final Office Action issued in related U.S. Appl. No. 15/928,977 dated Apr. 23, 2019, 20 pages.
International Preliminary Report on Patentability issued by the International Bureau of WIPO dated Sep. 24, 2019 in related international application No. PCT/US2018/023836, 7 pages.

(56) References Cited

OTHER PUBLICATIONS

International Search Report and Written Opinion issued by the International Searching Authority, the European Patent Office, dated Jun. 29, 2018 in related international application No. PCT/US2018/024065, 11 pages.
International Preliminary Report on Patentability issued by the International Bureau of WIPO dated Sep. 24, 2019 in related international application No. PCT/US2018/024065, 8 pages.
Communication pursuant to Rules 161(1) and 162EPC issued by the European Patent Office dated Oct. 30, 2019 in related European Patent Application No. 18717184.8, 3 pages.
Communication pursuant to Rules 161(1) and 162EPC issued by the European Patent Office dated Oct. 30, 2019 in related European Patent Application No. 18718031.0, 3 pages.
U.S. Non-Final Office Action issued by the U.S. Patent and Trademark Office dated May 21, 2019 in related U.S. Appl. No. 15/934,462, 26 pages.
U.S. Non-Final Office Action issued by the U.S. Patent and Trademark Office dated Jul. 27, 2020 in related U.S. Appl. No. 16/171,303, 13 pages.
Final Office Action issued by the United States Patent and Trademark Office in related U.S. Appl. No. 16/171,303 dated Feb. 11, 2021, 14 pages.
Notice on the First Office Action and First Office Action, along with its English translation, issued by the China National Intellectual Property Administration issued in related Chinese Patent Application No. 201880069729.0 dated Mar. 3, 2021, 16 pages.
Notice on the First Office Action and First Office Action, along with its English translation, issued by the China National Intellectual Property Administration issued in related Chinese Patent Application No. 201880069684.7 dated Mar. 3, 2021, 14 pages.
Notice on the Second Office Action and Second Office Action, along with its English translation, issued by the China National Intellectual Property Administration in related Chinese Patent Application No. 201880069642.3 dated Oct. 20, 2021, 13 pages.
Communication pursuant to Article 94(3) EPC issued by the European Patent Office in related European Patent Application No. 18716070.0 dated Nov. 11, 2021, 5 pages.
Communication pursuant to Article 94(3) EPC issued by the European Patent Office in related European Patent Application No. 18717184.8 dated Nov. 11, 2021, 4 pages.
Communication pursuant to Article 94(3) EPC issued by the European Patent Office in related European Patent Application No. 18718031.0 dated Nov. 11, 2021, 4 pages.
Notice on the Second Office Action and Second Office Action, along with its English translation, issued by the China National Intellectual Property Administration issued in related Chinese Patent Application No. 201880069649.5 dated Nov. 18, 2021, 7 pages.
Examiner's Report issued by the Innovation, Science and Economic Development Canada (Canadian Intellectual Property Office) in related Canadian Patent Application No. 3,076,511 dated Jan. 4, 2022, 4 pages.
Non-Final Office Action issued by the United States Patent and Trademark Office in related U.S. Appl. No. 16/789,917 dated Jan. 11, 2022, 34 pages.
Examiner's Report issued by the Innovation, Science and Economic Development Canada (Canadian Intellectual Property Office) in related Canadian Patent Application No. 3,078,778 dated Jan. 26, 2022, 4 pages.

\* cited by examiner

SYSTEMS AND METHODS FOR PROCESSING OBJECTS INCLUDING MOBILE MATRIX CARRIER SYSTEMS

PRIORITY

The present application is a continuation of U.S. patent application Ser. No. 15/926,497, filed Mar. 20, 2018, which claims priority to U.S. Provisional Patent Application Ser. No. 62/473,790 filed Mar. 20, 2017 as well as U.S. Provisional Patent Application Ser. No. 62/578,030 filed Oct. 27, 2017, the disclosures of both of which are hereby incorporated by reference in their entireties.

BACKGROUND

The invention generally relates to object processing systems, and relates in particular to automated storage and retrieval systems that are used with systems for processing objects.

Automated storage and retrieval systems (AS/RS) generally include computer controlled systems for automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

In these traditional systems, the totes are brought to a person, and the person may either remove an item from the tote or add an item to the tote. The tote is then returned to the storage location. Such systems, for example, may be used in libraries and warehouse storage facilities. The AS/RS involves no processing of the items in the tote, as a person processes the objects when the tote is brought to the person. This separation of jobs allows any automated transport system to do what it is good at—moving totes—and the person to do what the person is better at—picking items out of cluttered totes. It also means the person may stand in one place while the transport system brings the person totes, which increases the rate at which the person can pick goods.

There are limits however, on such conventional systems in terms of the time and resources required to move totes toward and then away from each person, as well as how quickly a person can process totes in this fashion in applications where each person may be required to process a large number of totes. There remains a need therefore, for an AS/RS that stores and retrieves objects more efficiently and cost effectively, yet also assists in the processing of a wide variety of objects.

SUMMARY

In accordance with an embodiment, the invention provides a storage, retrieval and processing system for processing objects. The storage, retrieval and processing system includes a plurality of storage bins providing storage of a plurality of objects, where the plurality of storage bins is in communication with a bin conveyance system for moving selected storage bins to a storage bin processing location, a programmable motion device in communication with the bin processing location for receiving a selected storage bin from the plurality of bins, where the programmable motion device includes an end effector for grasping and moving a selected object out of a selected storage bin, and a plurality of destination bins in communication with the bin conveyance system for moving a selected destination bin from a destination bin processing location that is proximate the programmable motion device to the plurality of destination bins.

In accordance with another embodiment, the invention provides a storage, retrieval and processing system for processing objects including a plurality of storage bins providing storage of a plurality of objects, where the plurality of storage bins is in communication with a storage bin conveyance system for moving selected storage bins to a storage bin processing location, a programmable motion device in communication with the storage bin processing location for receiving a selected storage bin from the plurality of bins, where the programmable motion device includes an end effector for grasping and moving a selected object out of a selected storage bin, and a plurality of destination bins in communication with the conveyance system for moving a selected destination bin from a destination bin processing location that is proximate the programmable motion device to the plurality of destination bins.

In accordance with a further embodiment, the invention provides a method of providing storage, retrieval and processing of objects. The method includes the steps of providing a plurality of storage bins for storage of a plurality of objects, moving a selected storage bin to a storage bin processing location using a storage bin conveyance system, receiving the selected storage bin, grasping and moving a selected object out of the selected storage bin to selected destination bin, and moving the selected destination bin from a destination bin processing location that is proximate the programmable motion device to a plurality of destination bins.

BRIEF DESCRIPTION OF THE DRAWINGS

The following description may be further understood with reference to the accompanying drawings in which.

The drawings are shown for illustrative purposes only.

DETAILED DESCRIPTION

In accordance with an embodiment, the invention provides a storage, retrieval and processing system for processing objects. The system includes a plurality of storage bins, a plurality of destination bins, and a programmable motion device. The plurality of storage bins provide storage of a plurality of objects and are in communication with a bin conveyance system for moving selected storage bins to a storage bin processing location. The programmable motion device is in communication with the bin processing location for receiving a selected storage bin from the plurality of bins. The programmable motion device includes an end effector for grasping and moving a selected object out of a selected storage bin. The plurality of destination bins is in communication with the bin conveyance system for moving a selected destination bin from the plurality of bins to a destination bin processing location that is proximate the programmable motion device.

Figure 1:
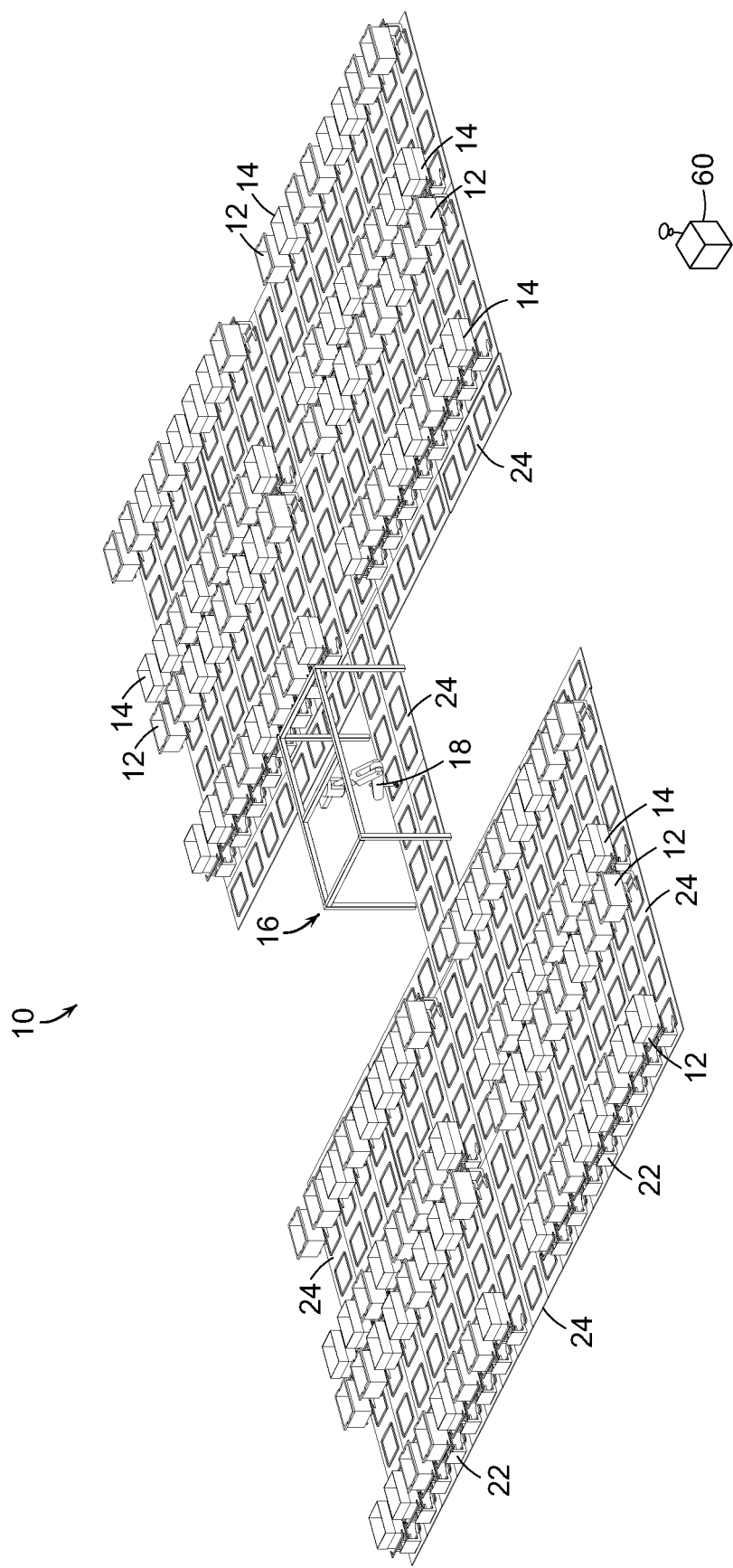
FIG. 1 shows an illustrative diagrammatic view of a storage, retrieval and processing system in accordance with an embodiment of the present invention.
Figure 2:
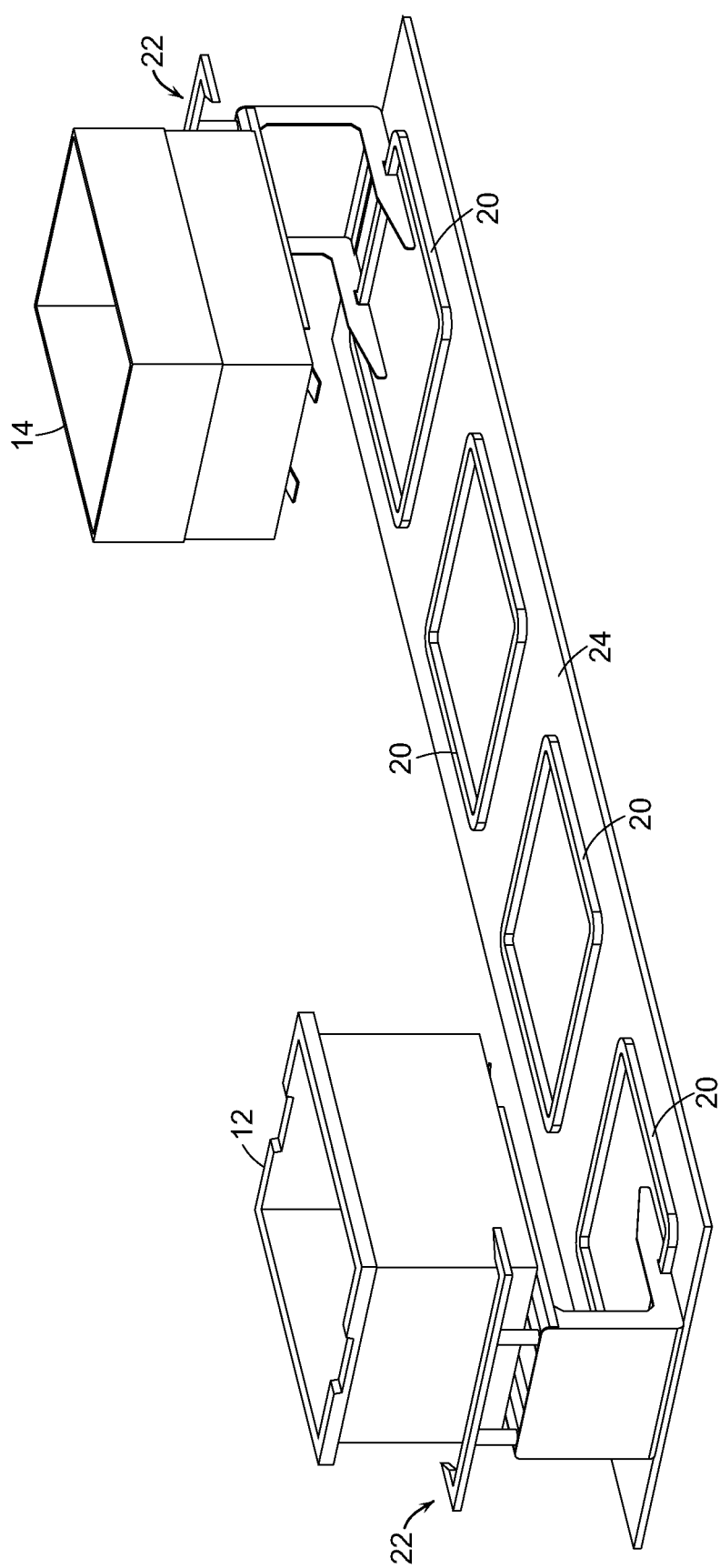
FIG. 2 shows an illustrative diagrammatic view of a portion of the storage, retrieval and processing system of FIG. 1.

With reference to FIG. 1, a system 10 of an embodiment of the present invention includes a plurality of storage bins 12, a plurality of destination bins 14, and a bin processing section 16 that includes a programmable motion device 18. The bins 12, 14 may be stored on racks 22, and are movable about the system 10 on carriers (discussed below) that run on track sections 24. With further reference to FIG. 2, the bins 12, 14 may be located on shelves 22 that are positioned on the track sections 24, and the track sections may include a plurality of discontinuous tracks 20.

Figure 3:
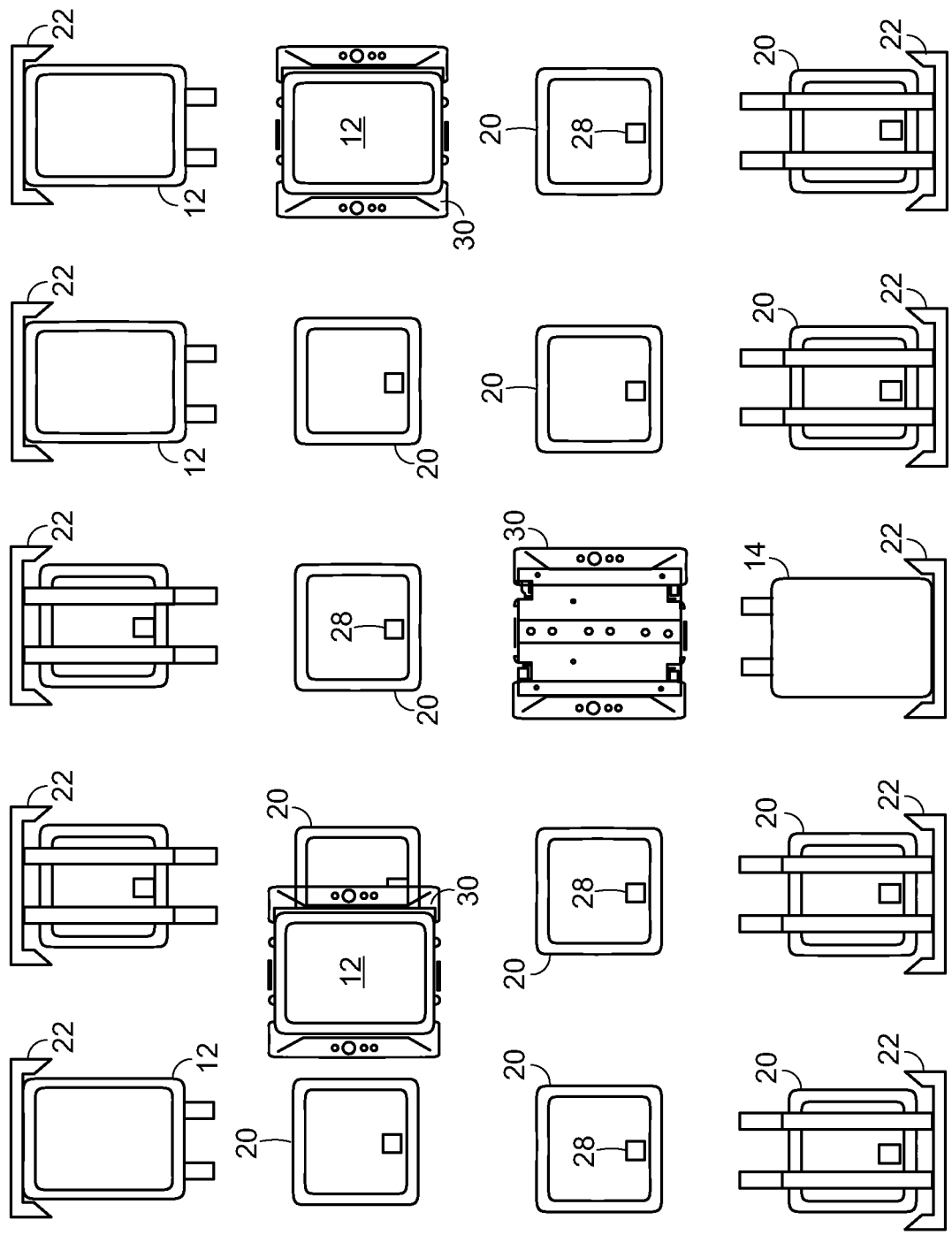
FIG. 3 shows an illustrative diagrammatic view of a larger portion of the storage, retrieval and processing system of FIG. 1.

With further reference to FIG. 3, each of the storage bins 12 and destination bins 14 may be transferred to and from mobile carriers 30 for movement about the tracks 20. In accordance with an embodiment, the mobile carriers may include swivel mounted wheels that rotate ninety degrees to cause each mobile carrier to move either forward and backward, or side to side. When placed on a grid, such mobile carriers may be actuated to move to all points on the grid.

Figure 4:
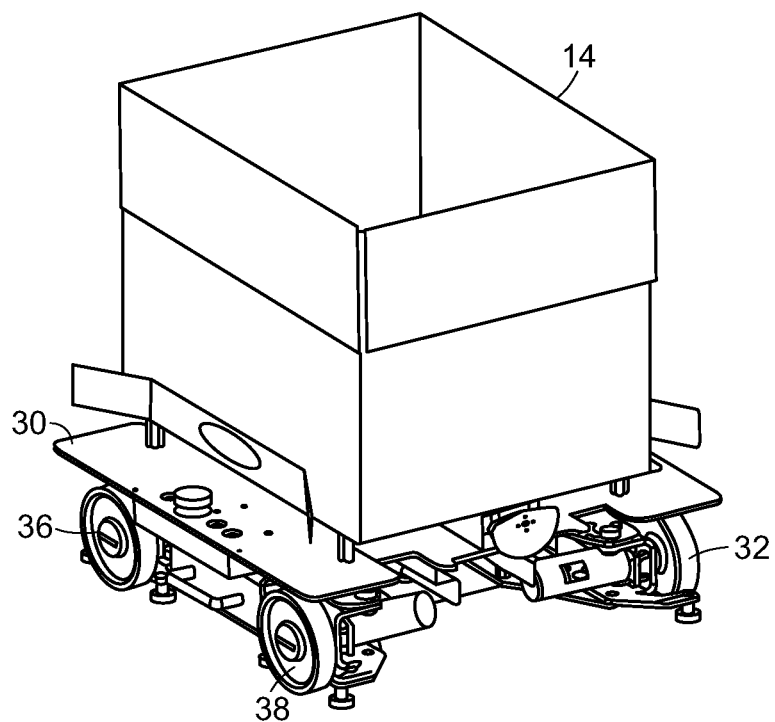
FIG. 4 shows an illustrative diagrammatic view of a carrier and bin in a storage, retrieval and processing system of FIG. 1.

FIG. 3 shows a portion of a system that is formed of multiple track sections (one track section is shown in FIG. 2), and each track section includes a plurality of tracks 20. The system also includes one or more mobile carrier units 30 that carry a bin 12, 14 as shown in FIG. 4. Each track 20 is generally in the form of a raised square with rounded edges, and the tracks 20 are generally closed spaced from each other (e.g., within a length or width of a mobile carrier unit 30). With reference to FIG. 4, each mobile carrier unit 30 may support a bin 12, 14 that may contain objects to be processed or that have been processed. A computer processor 60 may control the movement of each carrier unit 30 by wireless communication. The tracks 20 may also include sensors (as discussed further below) for detecting when each carrier unit 30 is positioned above each individual track 20.

Each mobile carrier unit 30 includes a pair of guide rails 42, 44 that contain the bin 12, 14, as well as a raised region 46 that raises the bin sufficient for there to be room on either side of the raised region for shelf forks to engage the bin as will be further discussed below. Each carrier unit 30 also includes four wheel assemblies 32, 34, 36, 38 that each include guides 40 for following the tracks 20. Each of the wheel assemblies is pivotally mounted such that each wheel assembly may pivot 90 degrees as discussed below. Each carrier unit 30 also includes a pair of paddles 48, 50 on either end of the unit 30. Each paddle may be turned either upward to contain a bin on the unit, or turned downward to permit a bin to be loaded onto or removed from the unit as will also be discussed in more detail below.

Figure 5A:
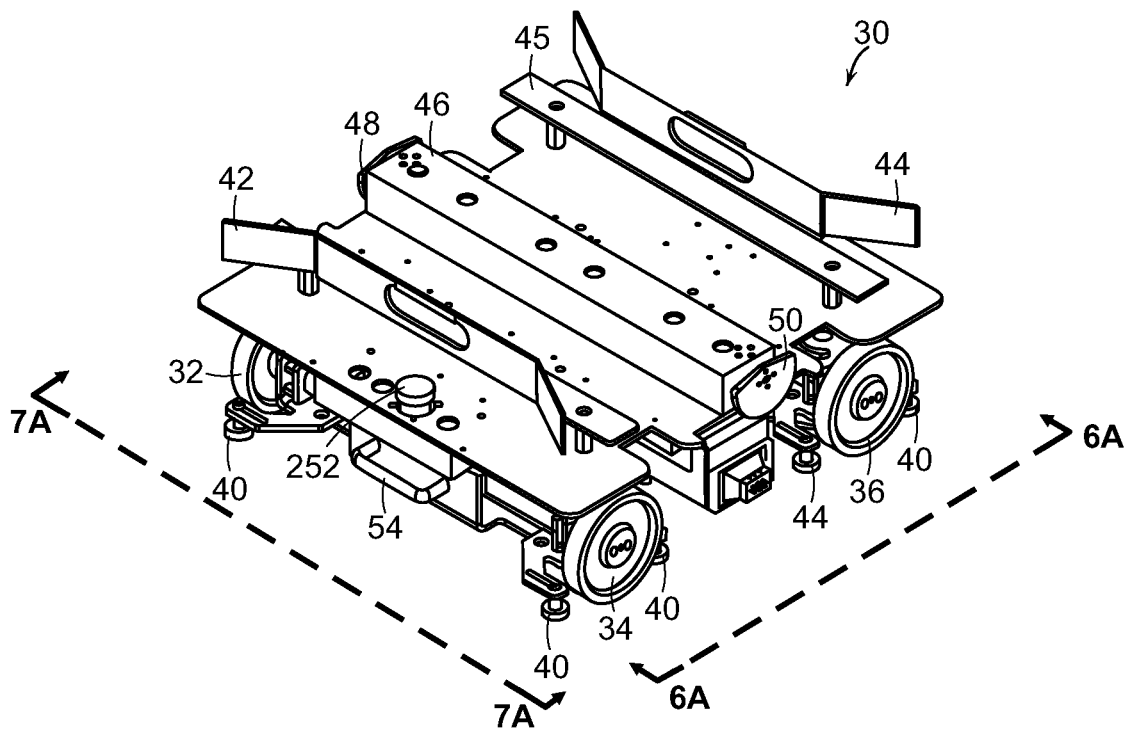
FIGS. 5A and 5B show illustrative diagrammatic isometric views of the carrier of FIG. 18 with the wheel assemblies in each of two different pivotal positions.
Figure 5B:
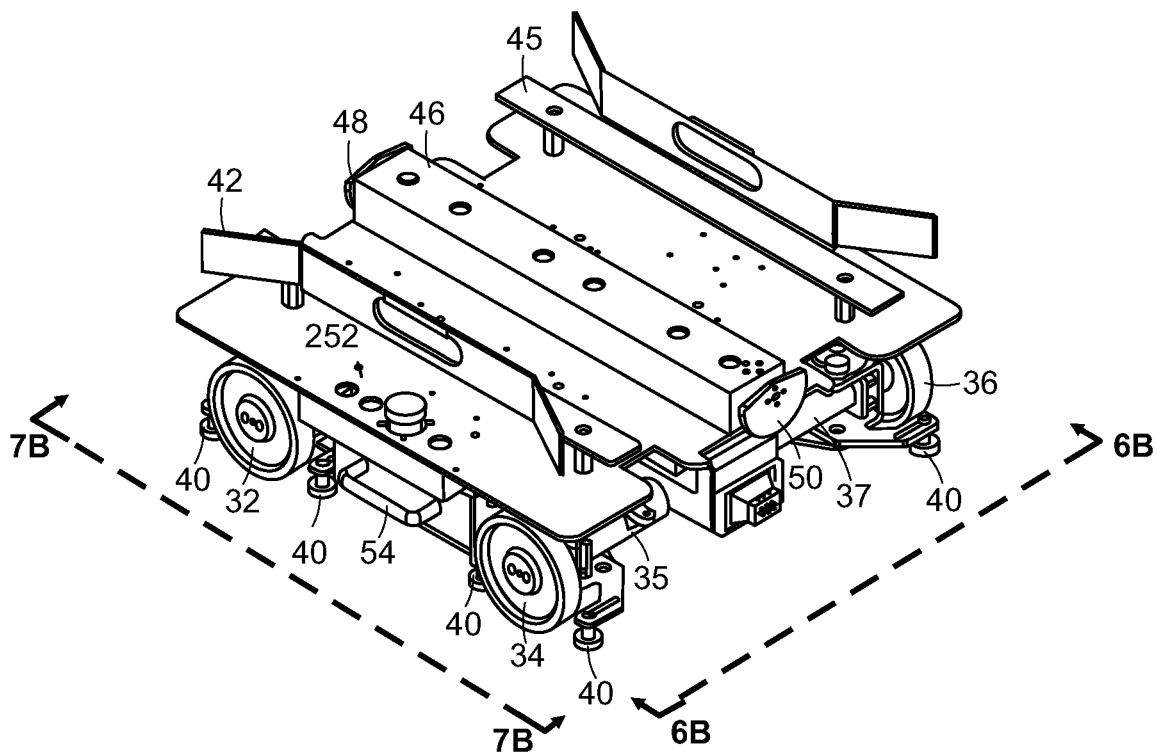
Figure 6A:
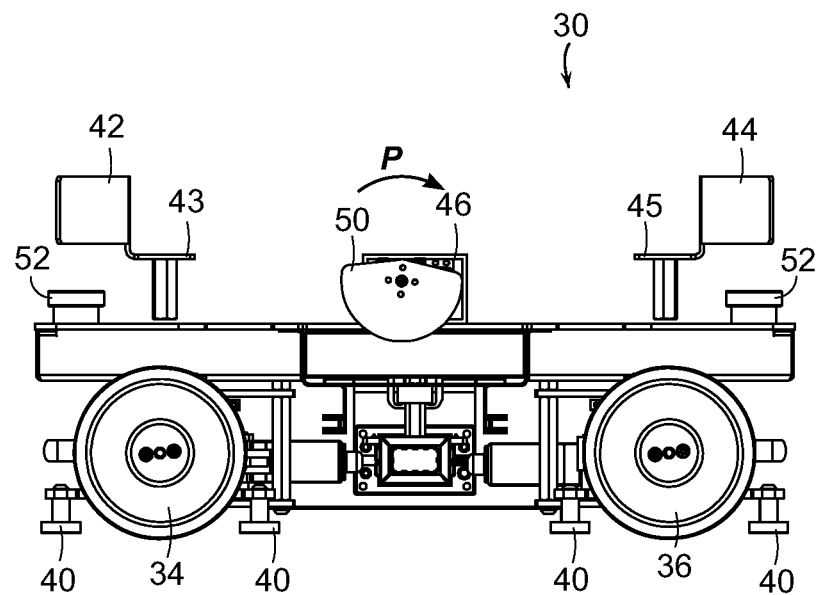
FIGS. 6A and 6B show illustrative diagrammatic side views of the carrier shown in FIGS. 5A and 5B taken along lines 6A-6A and 6B-6B respectively.
Figure 6B:
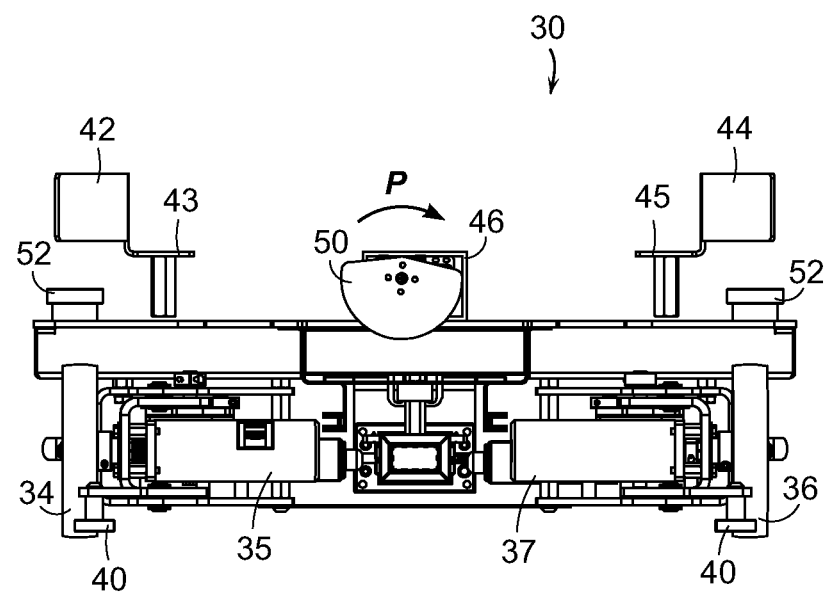
Figure 7A:
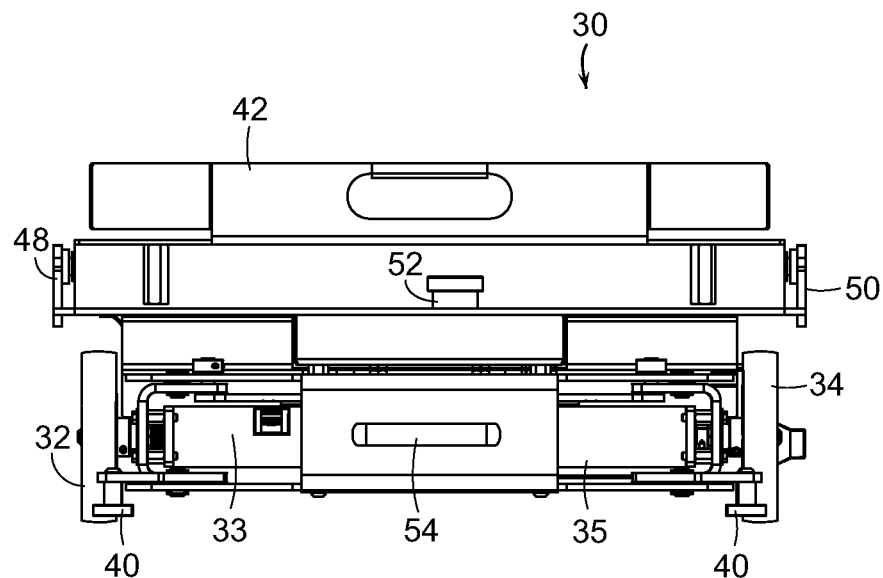
FIGS. 7A and 7B show illustrative diagrammatic end views of the carrier shown in FIGS. 5A and 5B taken along lines 7A-7A and 7B-7B respectively.
Figure 7B:
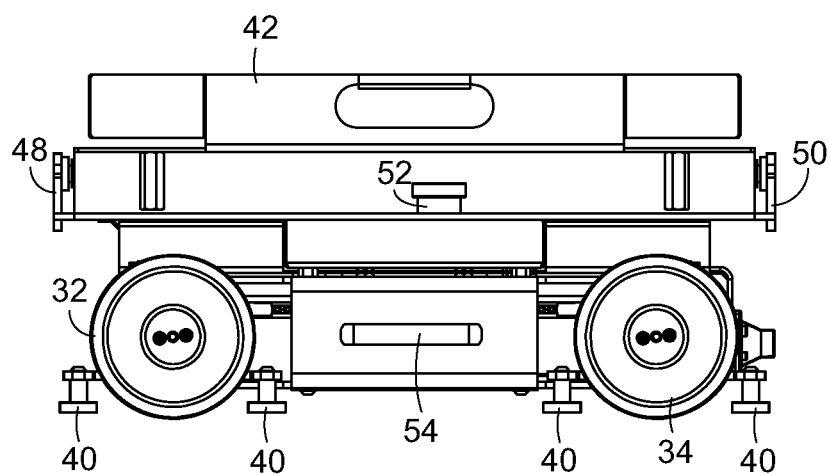

In accordance with certain embodiments therefore, the invention provides a plurality of mobile carriers that may include swivel mounted wheels that rotate ninety degrees to cause each mobile carrier to move forward and backward, or to move side to side. When placed on a grid, such mobile carriers may be actuated to move to all points on the grid. FIGS. 5A and 5B, for example, show a mobile carrier 30 that includes wheels 32, 34, 36 and 38 (shown in FIGS. 8A and 8B). Each of the wheels is mounted on a motor 33, 35, 37, 39 (as best shown in FIG. 8B), and the wheel and motor units (wheel assemblies) are pivotally mounted to the carrier 30 as discussed in more detail below. The wheel assemblies (each including a wheel, its motor and track guides 40) are shown in one position in FIG. 5A, and are shown in a second pivoted position in FIG. 5B. FIG. 6A shows an end view of the carrier 30 taken along lines 6A-6A of FIG. 5A, and FIG. 6B shows an end view of the carrier 30 taken along lines 6B-6B of FIG. 5B. Similarly, FIG. 7A shows a side view of the carrier 30 taken along lines 7A-7A of FIG. 5A, and FIG. 7B shows a side view of the carrier 30 taken along lines 7B-7B of FIG. 5B.

Each carrier 30 also includes a pair of opposing rails 42, 44 for retaining a bin, as well as a raised center portion 46 and stands 43, 45 on which a bin may rest. A pair of independently actuated paddles 48, 50 are also provided. Each paddle 48, 50 may be rotated upward (as shown at P in FIG. 6A) to retain a bin on the carrier, or may rotated downward to permit a bin to be moved onto or off of a carrier. The paddles 48, 50 are shown rotated downward in FIGS. 5A-7B.

Note that the orientation of the carrier 30 (also a bin on the carrier) does not change when the carrier changes direction. Again, a bin may be provided on the top side of the carrier, and may be contained by bin rails 42, 44 on the sides, as well as actuatable paddles 48, 50. As will be discussed in further detail below, each paddle 48, 50 may be rotated 180 degrees to either urge a bin onto or off of a shelf, or (if both are actuated) to retain a bin on the carrier during transport. Each paddle may therefore be used in concert with movement of the carrier to control movement of the bin with respect to the carrier 30. For example, when on paddle is flipped into an upward position, it may be used to urge the bin onto a shelf or rack while the carrier is moving toward the shelf or rack. Each carrier may also include one or more emergency stop switches 52 for a person to use to stop the movement of a carrier in an emergency, as well as handles 54 to enable a person to lift the carrier if needed.

Figure 8A:
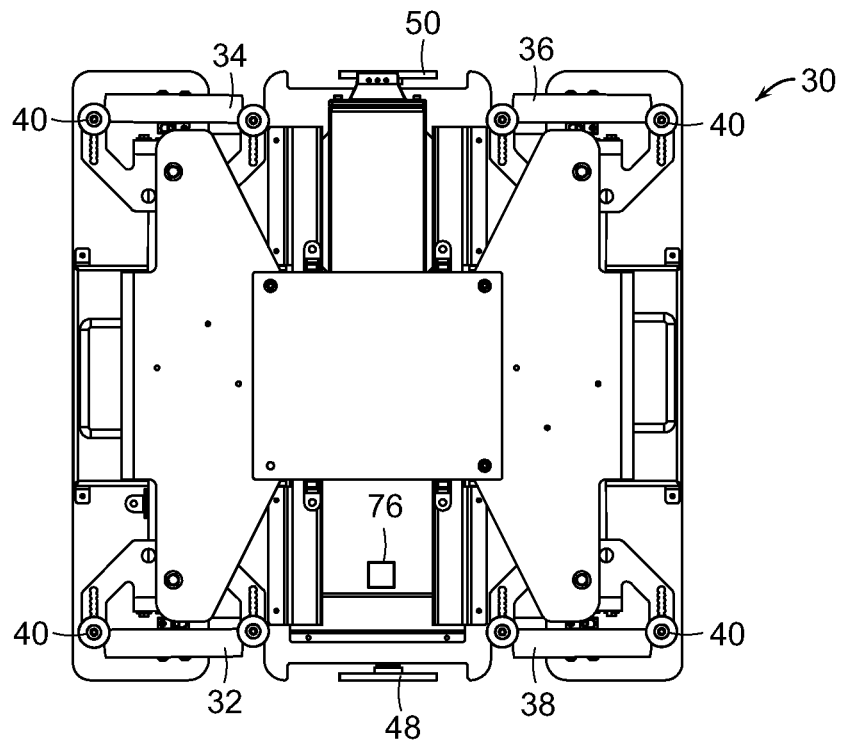
FIGS. 8A and 8B show illustrative diagrammatic bottom views of the carrier shown in FIGS. 5A and 5B respectively.
Figure 8B:
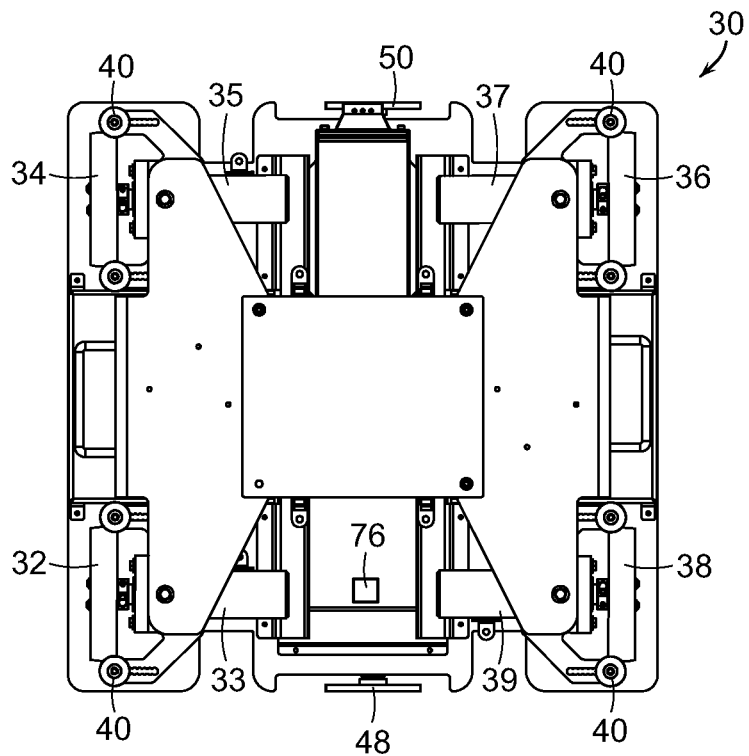
Figure 9B:
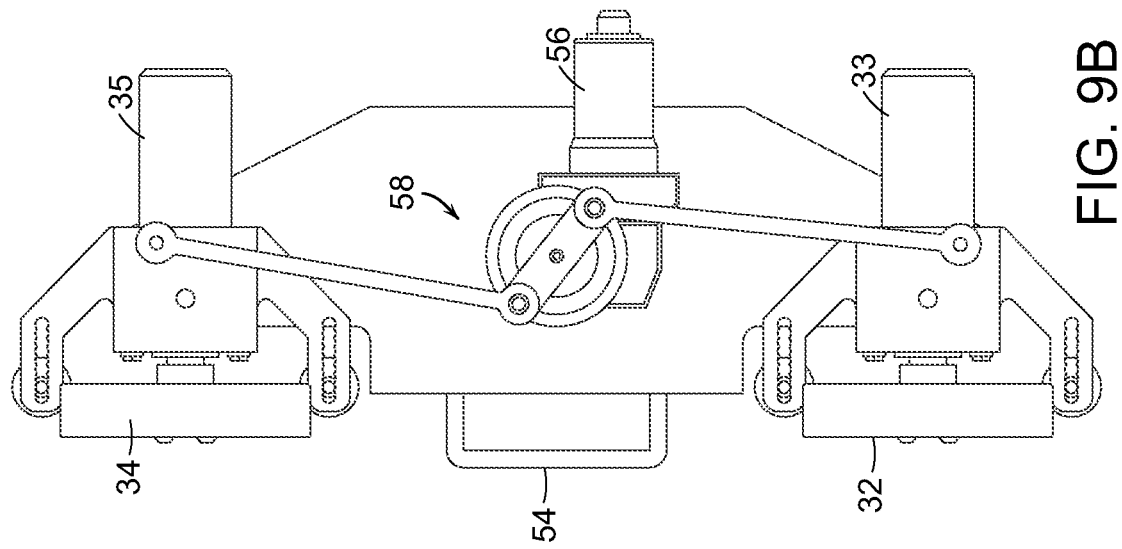
FIGS. 9A and 9B show illustrative diagrammatic views of pivotal wheel assemblies for use in a carrier of an embodiment of the present invention in each of two positions.
Figure 9A:
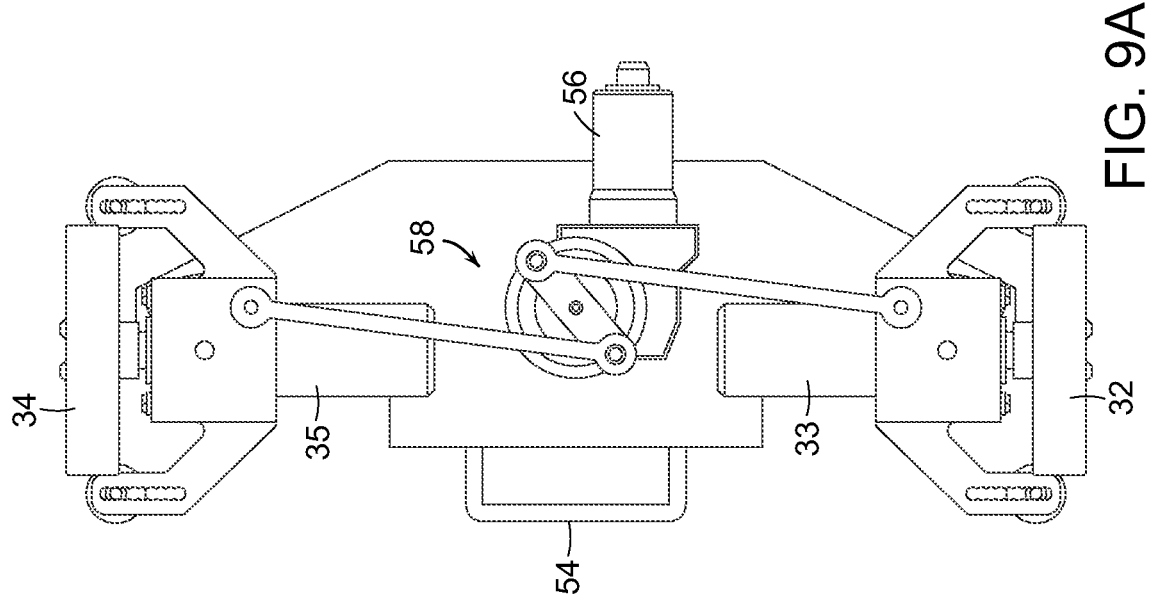
Figure 10A:
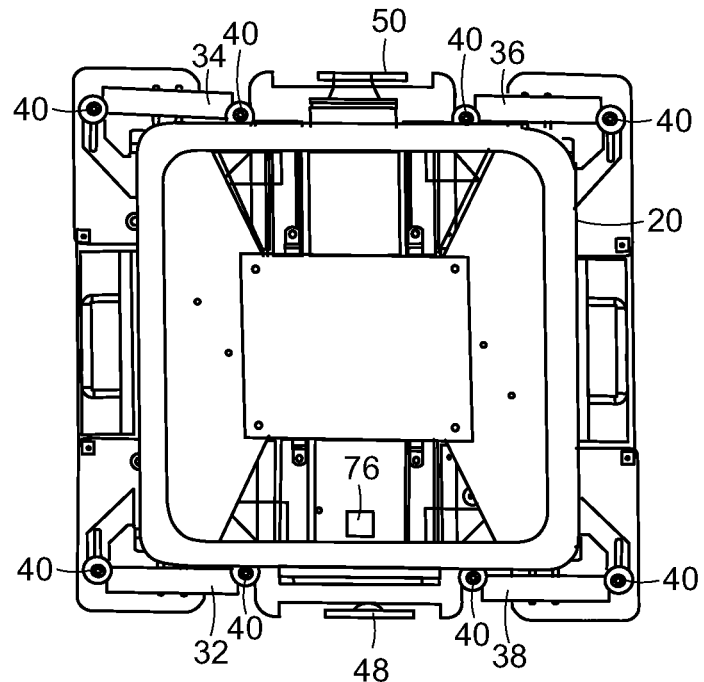
FIGS. 10A and 10B show illustrative diagrammatic bottom views of the carrier shown in FIGS. 8A and 8B respectively with track sections superimposed thereon for illustrative purposes.
Figure 10B:
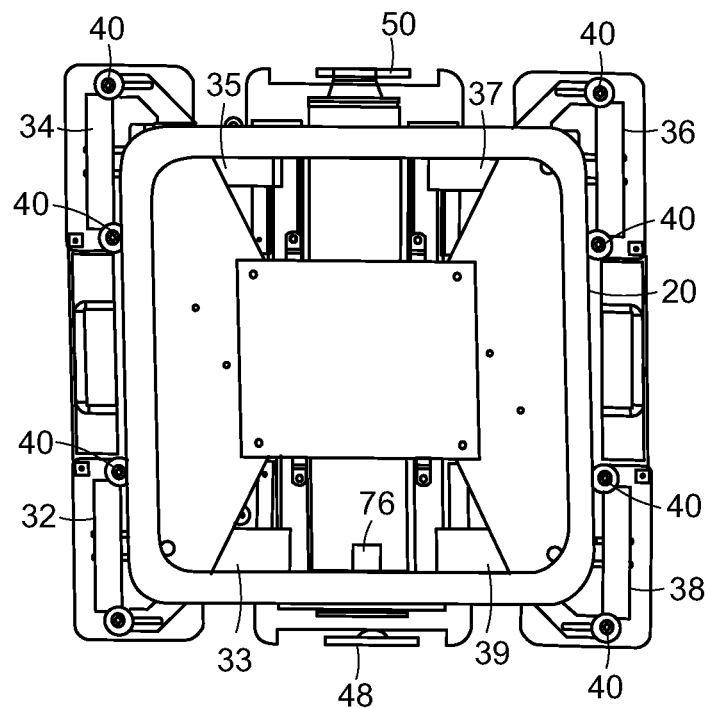

FIG. 8A shows a bottom view of the carrier 30 with the wheels in the position as shown in FIG. 5A, and FIG. 8B shows a bottom view of the carrier 30 with the wheels in the position as shown in FIG. 5B. FIGS. 8A and 8B show all of the wheels 32, 34, 36 and 38, and each of the motors 33, 35, 37 and 38 is also shown in FIG. 8B. As may be seen in FIGS. 8A and 8B, the entire wheel assemblies including the wheel, guide rollers and the wheel motor, each pivot as a unit. With reference to FIGS. 9A and 9B, each pair of wheel assemblies may, in an embodiment, be pivoted by a common pivot motor 56 that is coupled to the wheel assemblies via linkages 58. FIG. 9A shows a pair of wheel assemblies in a position as shown in FIG. 5A, and FIG. 9B shows the pair of wheel assemblies in a position as shown in FIG. 5B. The wheel assemblies are designed to be able to pivot the wheels around corners of a track section when the carrier is directly above a track section. FIGS. 10A and 10B show views similar to the underside views of FIGS. 8A and 8B but with a track 20 superimposed on the Figures to show the relation of the wheel positions to the track section. Note that the wheels pivot around each of the corners of the track section. When the carrier is centered over the track section, therefore, the wheels may be pivoted such that the carrier may move in a direction that is orthogonal to a prior direction without requiring that the carrier itself be turned. The orientation of the carrier is therefore maintained constant while the carrier is moved about an array of tracks sections.

Figure 11A:
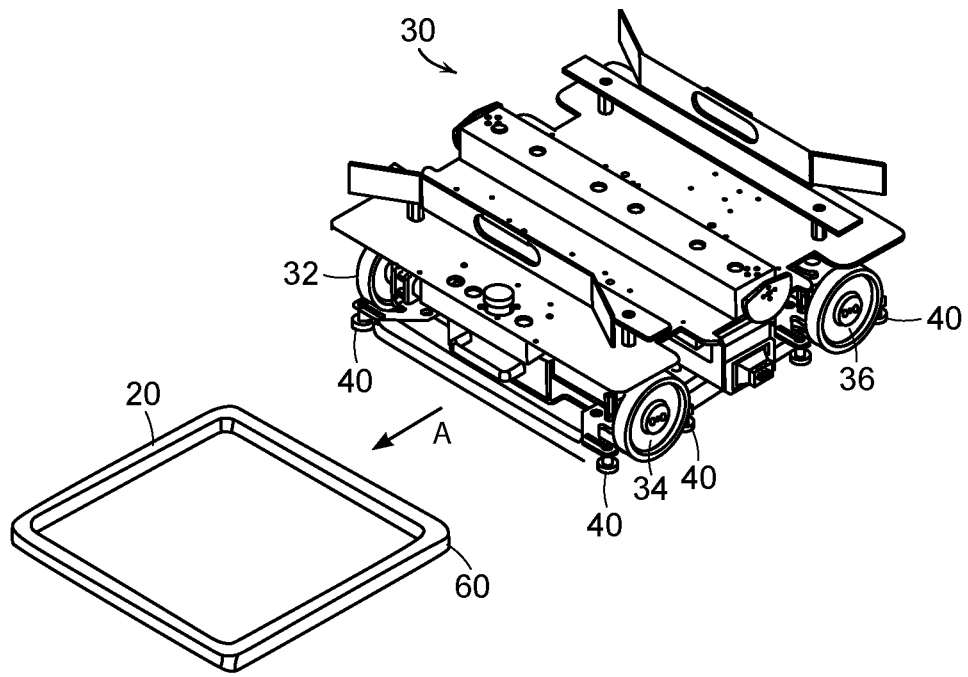
FIGS. 11A-11C show illustrative diagrammatic views of the carrier of FIG. 4 at different stages of engaging an adjacent track section during movement.
Figure 11B:
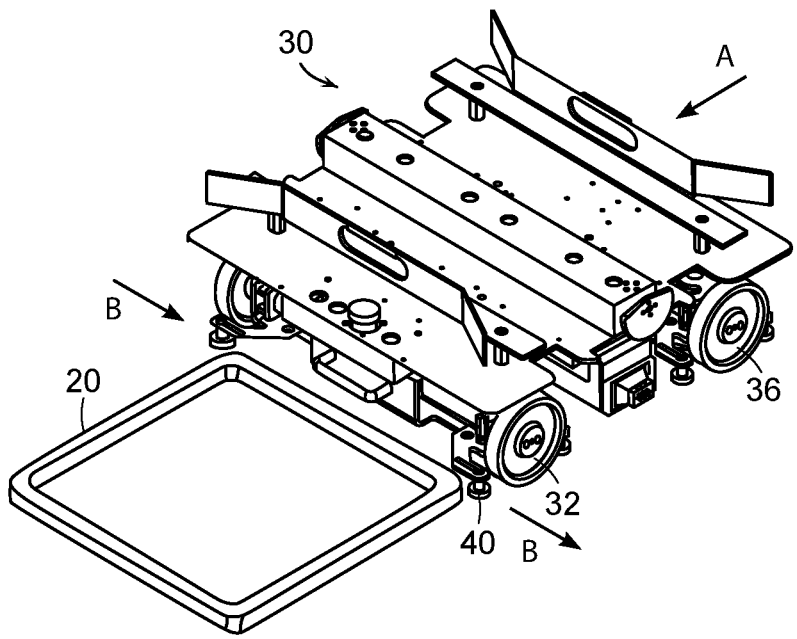

The movement of the carrier 30 about an array of tracks is further discussed below with regard to FIGS. 11A-11C. In short as a carrier leaves one track, it travels toward an adjacent track, and if at all misaligned, will realign itself. The realignment of the guide rollers and the tracks may function as follows. While the two sets of wheels (32, 34 and 36, 38) may be designed to move the carrier 30 in a linear direction only, some variations may occur. The tracks 20 are positioned, though intermittently, close enough to each other than when a carrier leaves one track and moves toward another 20 (as shown at A), its potential variation off course will be small enough that the rounded corners of the next adjacent track will urge the carrier back on course. For example, FIG. 11A shows a carrier 30 leaving a track and beginning to approach a next track 20 as the carrier moves in a direction as indicated at A. As shown in FIG. 11B, if the alignment of the carrier 30 is off (possibly from variations in the wheels or the mounting of the wheels, the placement of the track sections or any other variable), one of the rounded corners 60 of next adjacent track 12 will become engaged by an on-coming guide wheel 40, and the rounded corner 60 will cause the carrier 30 to move slightly in a direction (as shown at B) perpendicular to the direction A to correct the direction of movement of the carrier 30. If a carrier does stop moving, the directions of movement of the other carriers are programmed to avoid the area of the stopped carrier until it is removed. If an area results in a number of stopped carriers over time, the alignment of the track(s) in the area may be examined and/or replaced.

Figure 11C:
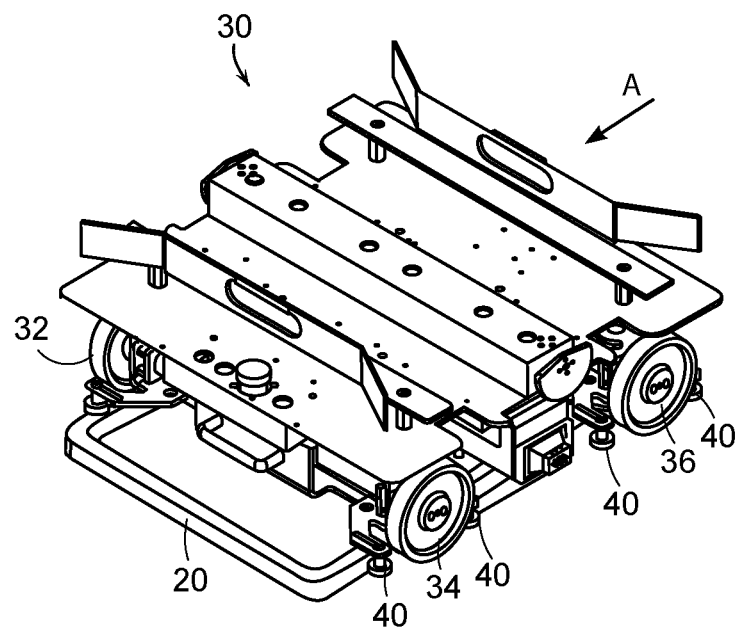
Figure 12:
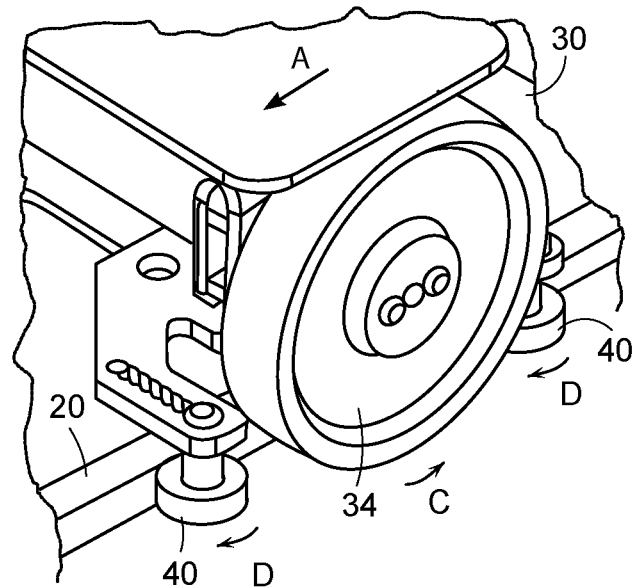
FIG. 12 shows an illustrative diagrammatic view of guide rollers of the carrier of FIG. 4 engaging a track section.
Figure 13:
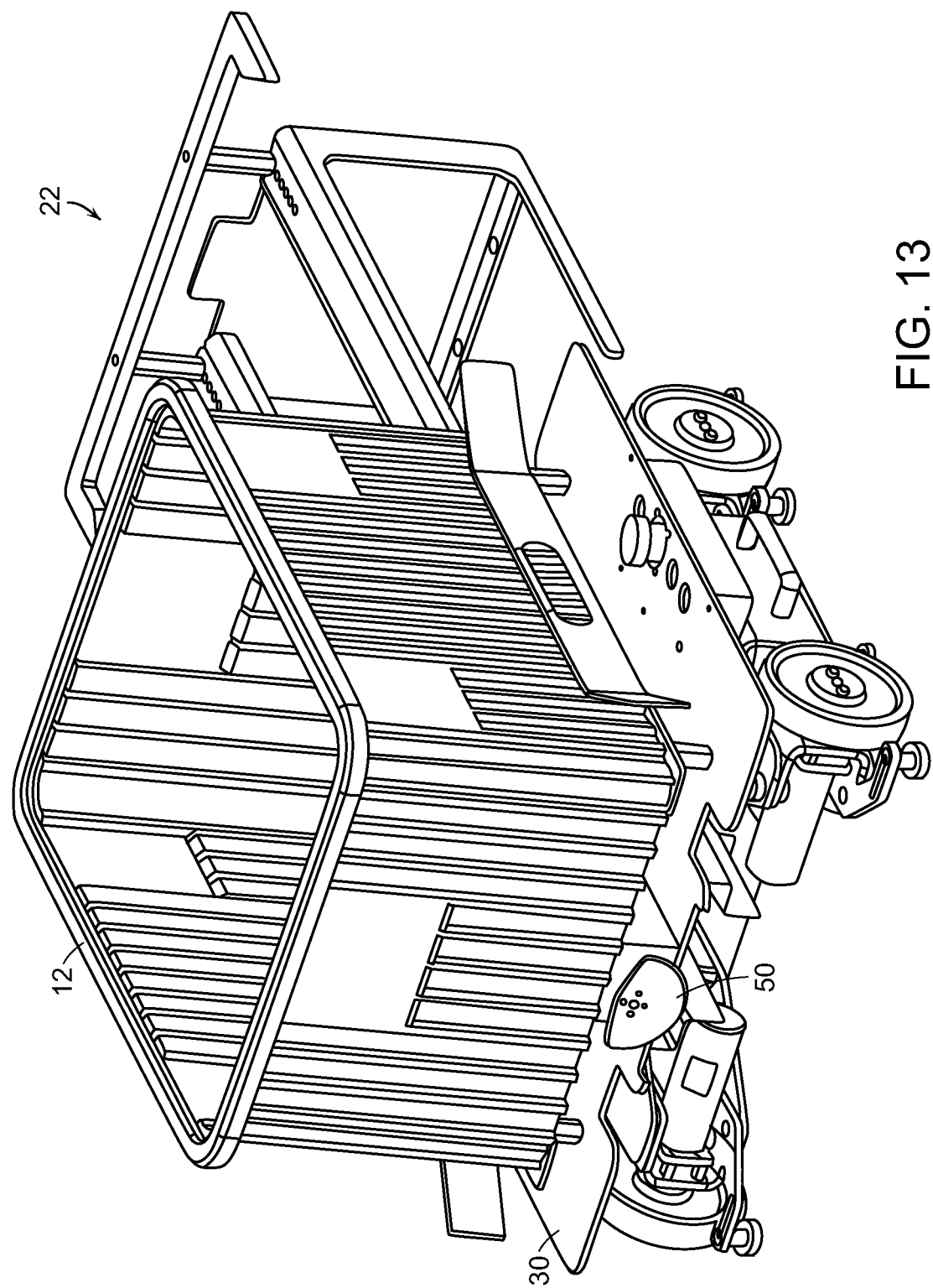
FIG. 13 shows an illustrative diagrammatic isometric view of a carrier engaging a bin with a rack in accordance with an embodiment of the present invention.
Figure 14:
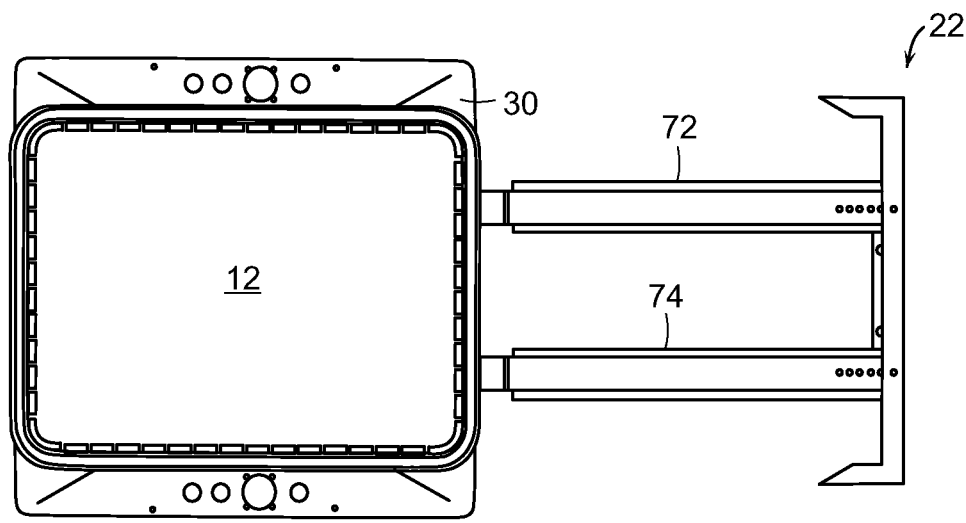
FIG. 14 shows an illustrative diagrammatic top view of the carrier, bin and rack of FIG. 13.
Figure 15:
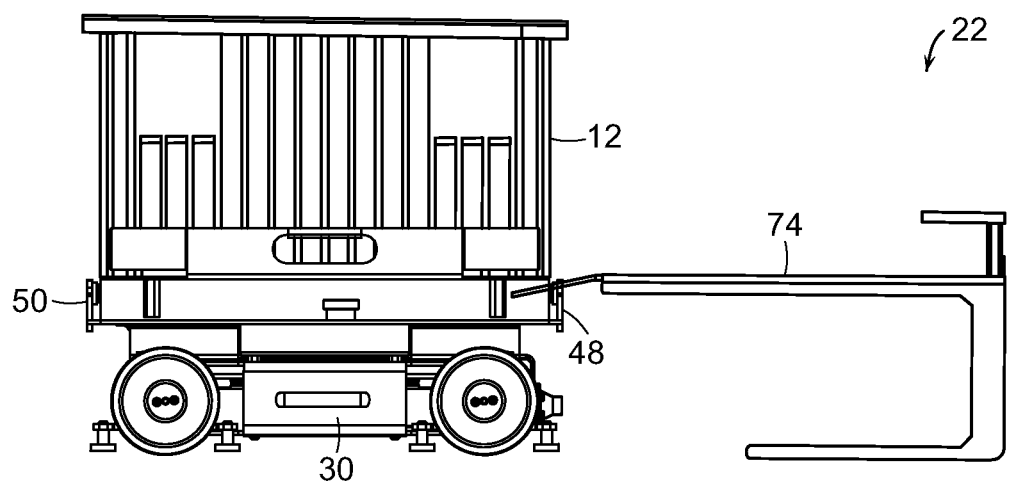
FIG. 15 shows an illustrative diagrammatic side view of the carrier, bin and rack of FIG. 13.

FIG. 11C shows the carrier 30 moving in a direction A as properly realigned by the track 20. FIG. 12 shows a close up view of the wheel 34 moving in a direction as shown at C to cause the carrier to move in the direction A, and further shows that the guide rollers 40 roll against the track 20 in directions as shown at D. The guide rollers 400 do not touch the ground (as does the wheel 34), but simply guide the direction of the carrier 30 by being urged against the track 20. In further embodiments, biasing means such as springs, elastics or pneumatics may be used to urge the guide rollers against the track, and in further embodiments, the tracks may be more triangular shaped at the edges to further facilitate reception of the carriers. If too much correction is required, however, the system may be operating inefficiently.

Systems of the invention therefore provide for binary steering of the automated carrier, allowing only bidirectional column and row travel in a grid. One pivot motor may be used for each pair of wheels, with a linkage to pivot the wheel modules. On other embodiments, one pivot motor and linkage could be used for all four wheels, or each wheel may have an independent pivot actuator. The system allows the wheels to follow square track sections by pivoting around rounded corners of the square track sections. The system does not require differential drive line/trajectory following, and keeps the orientation of the carrier fixed throughout all operations.

The bin shelf and retrieval system provides that bins (e.g., totes or boxes etc.) are carried by a carrier, which has a bin storage area that includes of a center rail, two side rails, and a motorized paddle on the front and back of the tote. When the bin is being driven around, both paddles are up and the bin is fully contained. To store a bin, the robot drives into a bin rack, which consists of two fork tines with an incline on the front, and the incline urges the bin above the rail height on the robot. The paddles are put down and the robot can drive away with the bin left behind on the rack. To retrieve a bin, the robot drives under the shelf, puts its paddles up, and drives away.

Figure 16A:
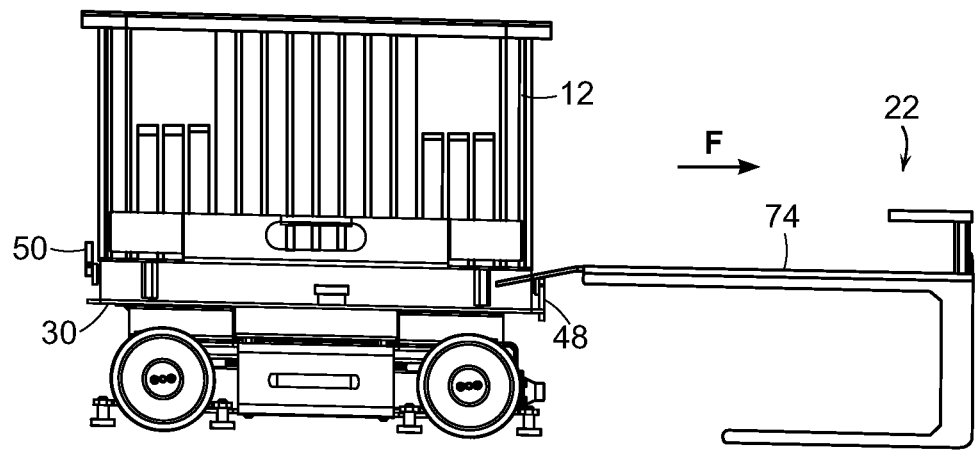
FIGS. 16A and 16B show illustrative diagrammatic side views of a carrier placing the bin onto the rack (FIG. 16A), and a carrier removing a bin from a rack (FIG. 16B)
Figure 16B:
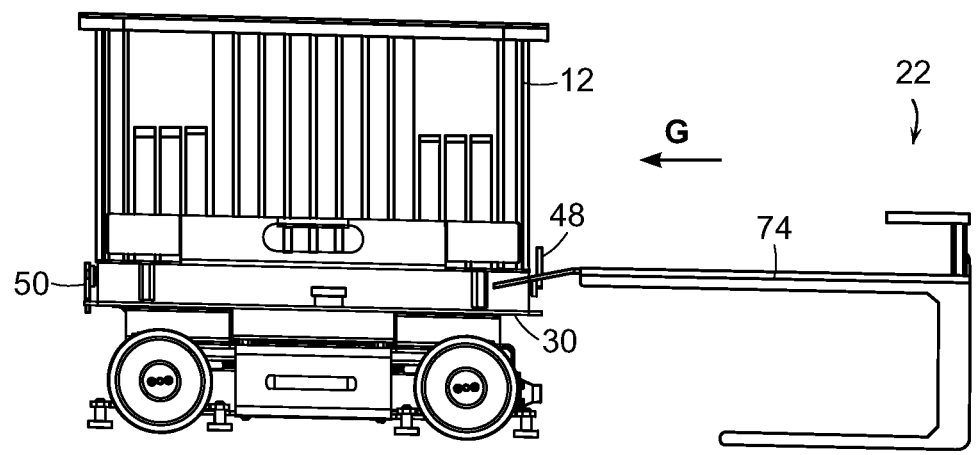

FIGS. 13-16B show the carrier 30 with the paddles 48, 50 in different configurations for moving bins 12, 14 onto and off of racks 22. FIG. 16A shows a side view of the carrier 30 with the paddle 50 engaged to urge the bin 16 onto the rack 22, and FIG. 16B shows a side view of the carrier 30 with the paddle 48 engaged to urge the bin 16 off of the rack 22. FIG. 16A shows the carrier 30 with the paddle 50 up such that the bin 16 on the carrier 30 may be moved onto a fixed rack 22 that includes two forks 72, 74. In particular, the forks 72, 74 have ramped ends that engage the carrier 30 between the underside of the bin 12, 14 and on either side of the raised center portion 46. To remove the bin 30 from the rack 22, the carrier 30 is driven under the rack, and the opposite paddle 48 is actuated. When the carrier is moved away from the rack, the paddle 48 urges the bin 12, 14 onto the carrier 30 as the carrier is driven away from the rack. FIG. 16B, for example, shows the carrier 30 with a the paddle 48 activated (as shown in FIG. 2) such that as the carrier 30 is moved away from the rack 22, the paddle 48 urges the bin 12, 14 onto the carrier 30.

As mentioned above, the track system may be formed of disconnected tracks. With reference again to FIG. 3, a portion of a track system is shown that includes a plurality of tracks 20, as well as racks 22. The guide rollers discussed above are positioned to roll against the outside of the tracks 20, and since the carriers generally travel in straight lines (either forward—backward or side—to side), the guide rollers are designed to engage the intermittent tracks and realign themselves due to each track having slightly rounded corners. Each intermittent track may also include a location code 28 (e.g., a QR code) that permits the carrier to register its location with the central controller 60. The carrier may include a detector 76 (such as a camera or a scanner) on the underside thereof as shown in FIGS. 8A, 8B and 10A, 10B that reads or detects each location code 28. Again, the orientation of each carrier does not change. In the system of FIG. 3, numerous discontinuous tracks 20 are shown, together with carriers 30. In particular, one carrier has left a bin 14 on rack 22 and has been given an instruction to move one track section to the North. Another carrier carrying bin 12 has been given an instruction to move one track section to the West, and another carrier is carrying bin 12. The system 60 moves each of the carriers in the tracks to avoid each other and to provide desired bins at appropriate shelves or racks. As noted, each carrier is provided an instruction to move only one or two track sections at a time. The system 60 is in constant communication with all of the carriers. In certain embodiments, the system provides a wireless heartbeat chain that provides bidirectional heartbeat between mobile carriers and fixed computing infrastructure. If a heartbeat isn't received by a mobile carrier, it triggers an emergency stop, and if a heartbeat isn't received by the processing system 60, it triggers an appropriate response.

Figure 17:
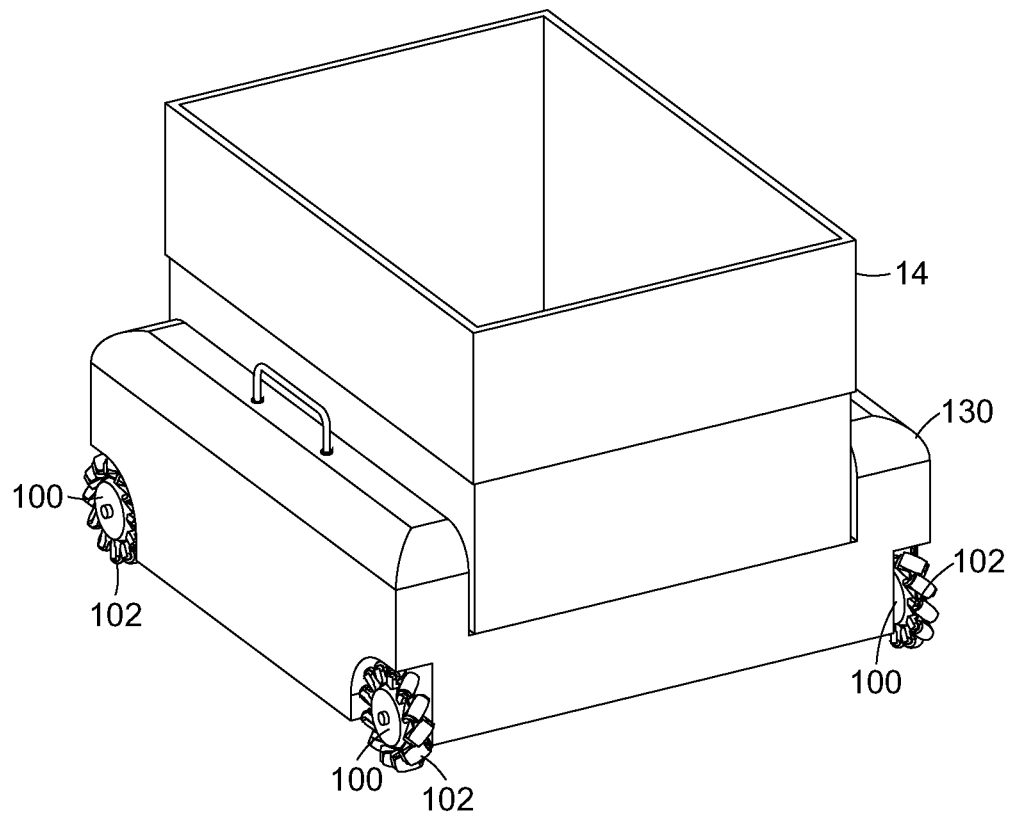
FIG. 17 shows an illustrative diagrammatic view of a carrier for use in a system in accordance with another embodiment of the present invention.
Figure 18:
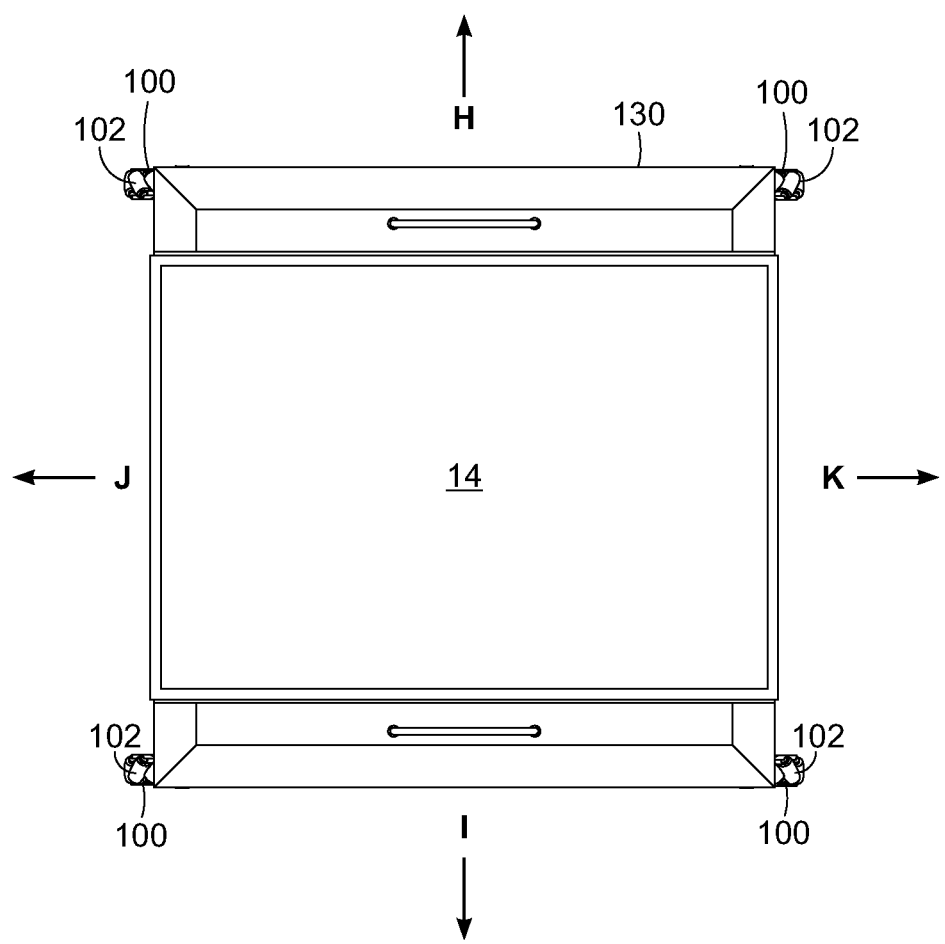
FIG. 18 shows an illustrative diagrammatic top view of the carrier shown in FIG. 17.

In other embodiments, each wheel may instead be a controllable omnidirectional wheel 100, such as the Mecanum wheels sold by Mecanum AB of Sweden. With reference to FIGS. 17, and 18, each of the automated carriers 130 may include set of controllable omnidirectional wheels 100. Each of the wheels 100 is generally a conventional wheel with a series of controllable rollers 102 attached to the circumference of each wheel. While the wheels 100 provide movement in directions as shown at J and K in FIG. 18, actuation of the rollers 102 (e.g., with limited controlled actuation of the wheels 100) provide movement in directions as shown at H and I in FIG. 18. In accordance with another embodiment, the carrier 130 may turn by operating opposing wheels in mutually reverse directions.

Figure 19:
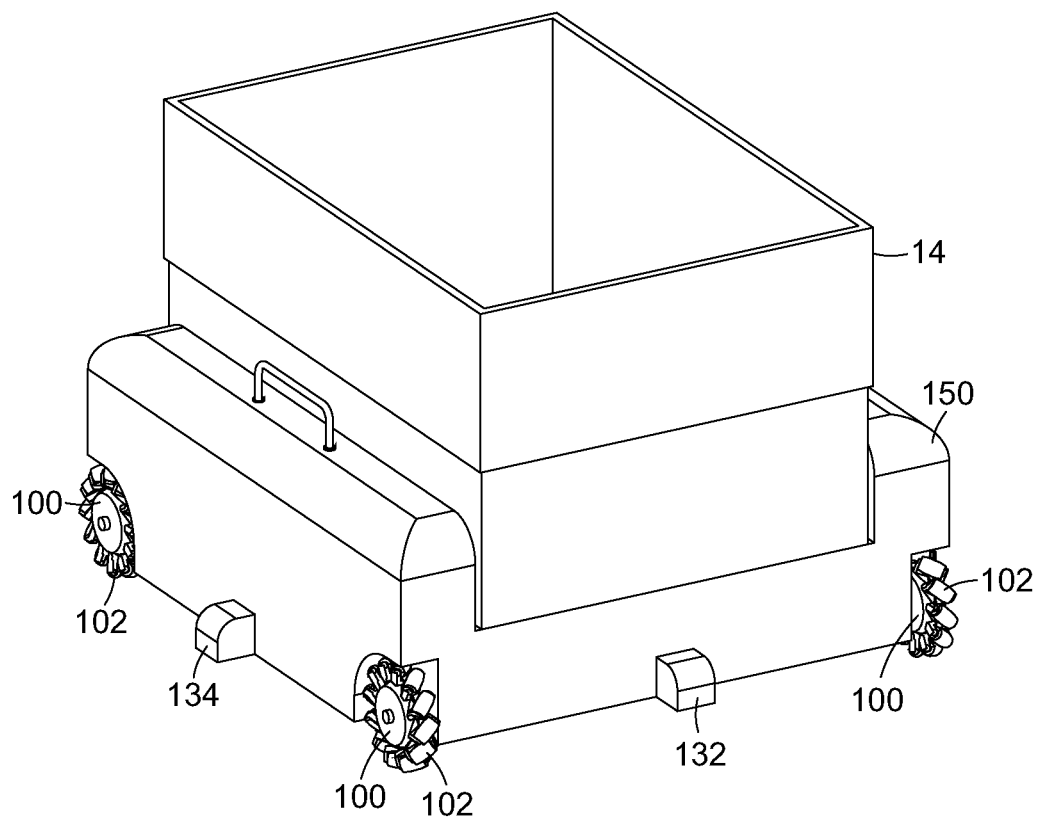
FIG. 19 shows an illustrative diagrammatic view of a carrier for use in a system in accordance with a further embodiment of the present invention.
Figure 20:
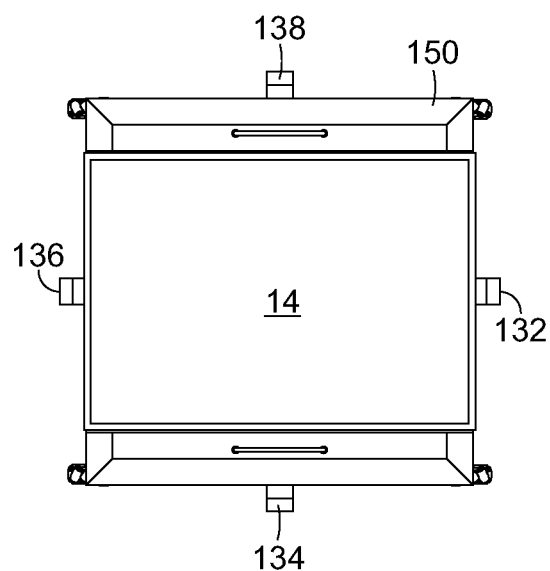
FIG. 20 shows an illustrative diagrammatic top view of the carrier shown in FIG. 19.
Figure 21:
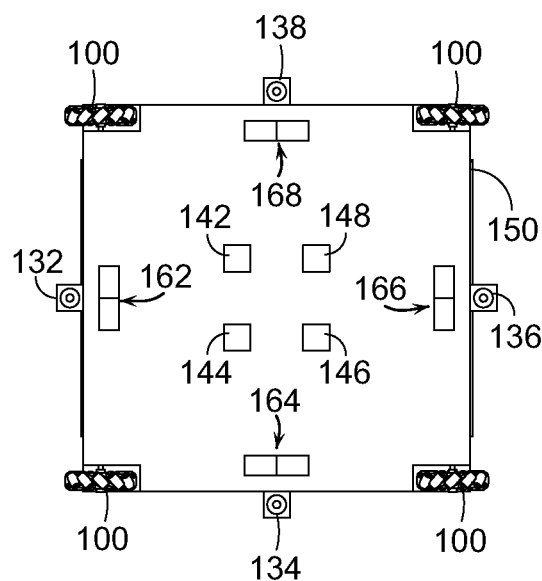
FIG. 21 shows an illustrative diagrammatic bottom view of the carrier shown in FIG. 19.

In accordance with a further embodiment, FIG. 19 shows a carrier 150 that includes four illumination sources 132, 134, 136, 138 for illuminating the track below each source. FIG. 20 shows a top view of the carrier 150, showing the position of each of the illumination sources 132, 134, 136, 138. FIG. 21 shows an underside of the carrier 150, which shows four pairs of illumination sensors 162, 164, 166, 168. As the carrier 150 moves over a track (e.g., a section of track that is under sensor pairs 162, 166), the system monitors the amount of light being received at each pair of underside sensors (e.g., each of pair 162 and each of pair 166) to determine if the amount of illumination being received by each of the pair is generally the same. If much more illumination is received by one of a pair, the system may assume that the carrier has run off course. Having two such pairs (e.g., 162, 166) for a painted track line, provides further robustness to the system. Additionally, sensors (or indicia) 142, 144, 146, 148 may be provided on the underside of each carrier 150 for communicating with any of indicia (or sensors) on the track. This may assist in providing further security in confirming the location of a carrier, and/or in providing turning instructions to a carrier.

Figure 22:
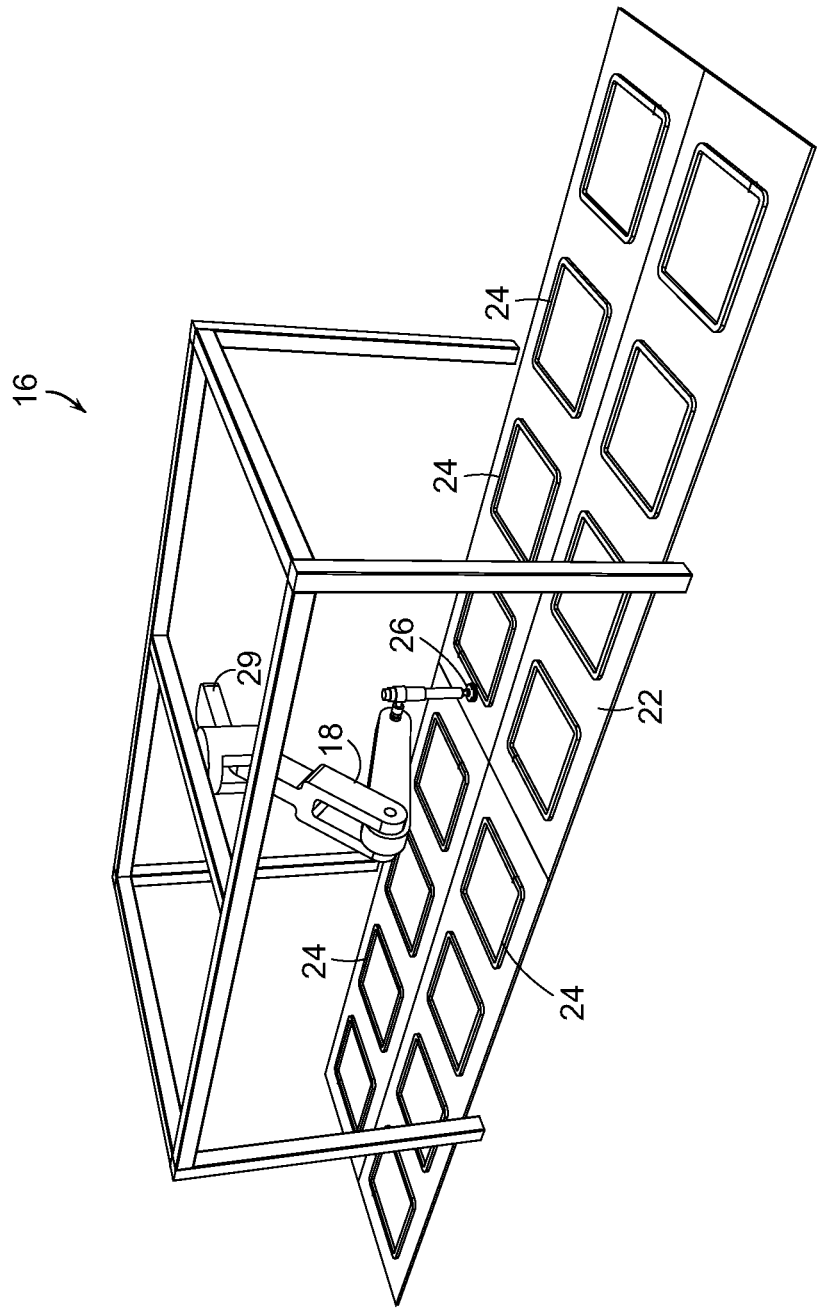
FIG. 22 shows an illustrative diagrammatic view of the bin processing system of FIG. 1.

FIG. 22 shows the processing station 16, that includes the programmable motion device 18 over a track section 24 that include the discontinuous tracks 20. The system provides that at least one storage bin 12 and at least one destination bin 14 may be presented to the programmable motion device 18. The programmable motion device 18 includes an end effector 26, and the processing station 16 also includes a perception unit 29. The two bins (12, 14) may be presented underneath the programmable motion device 18 (e.g., an articulated arm) such that the end effector 26 of the device 18 may be used to grasp objects from one bin and transfer the objects to another bin under the device 18. Generally, a selected storage bin is brought to the processing station at the same time that a selected destination bin is brought to the processing station, and the programmable motion device then moves an object from the selected storage bin 12 to the selected destination bin 14. Both bins 12, 14 are then returned to empty racks, while the system maintains knowledge of the location and contents of each bin. When a destination bin is completed, the bin may be brought by a carrier to an output conveyor for further processing or shipment.

The processing station 16 also includes the perception unit 29 for providing perception data (e.g., camera images or scanning data) regarding the bins 12, 14, and in particular, regarding the contents of the storage bins 12. Since the system places the bins 12, 14 at the processing station, the system will know the locations of the bins. The processing system however, should determine proper grasp locations of the objects in the bin(s) 14.

Figure 23:
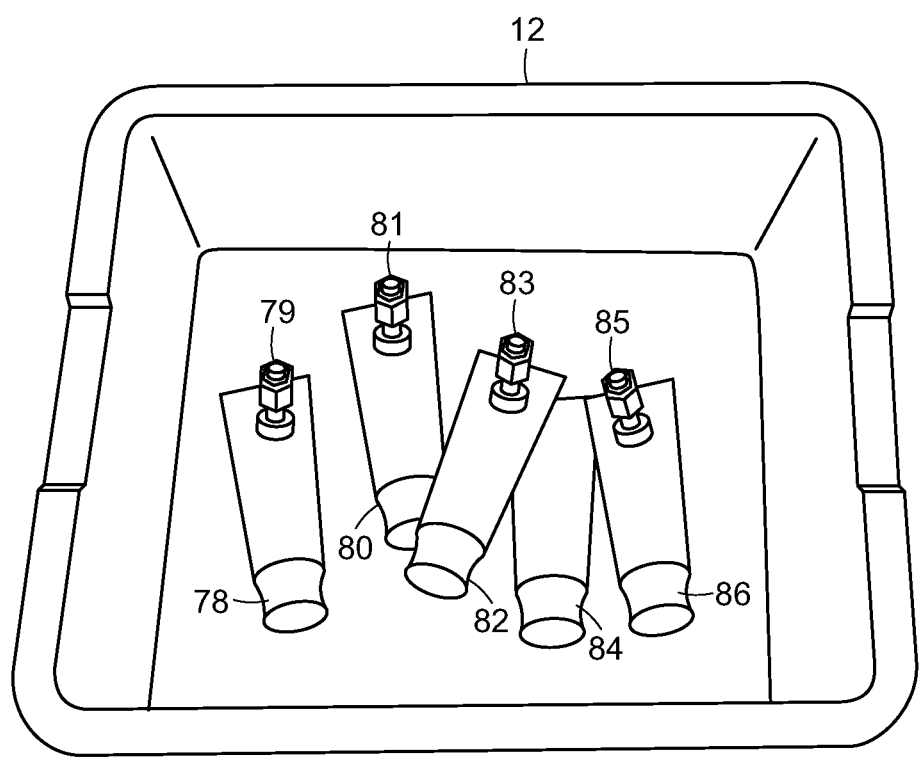
FIG. 23 shows an illustrative diagrammatic view from the perception system of FIG. 22, showing a view of objects within a bin of objects to be processed.

FIG. 23 shows an image view 50 of the bin 14 from the perception unit 40. The image view shows the bin 12, and the bin 12 contains objects 78, 80, 82, 84 and 86. In the present embodiment, the objects are homogenous, and are intended for distribution to different distribution packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp location 81 does not because its associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location as shown in FIG. 23. Grasp locations may be considered good, for example, if they are close to the center of mass of the object to provide greater stability during grasp and transport, and/or if they avoid places on an object such as caps, seams etc. where a good vacuum seal might not be available.

If an object cannot be fully perceived by the detection system, the perception system considers the object to be two different objects, and may propose more than one candidate grasps of such two different objects. If the system executes a grasp at either of these bad grasp locations, it will either fail to acquire the object due to a bad grasp point where a vacuum seal will not occur, or will acquire the object at a grasp location that is very far from the center of mass of the object and thereby induce a great deal of instability during any attempted transport. Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

Figure 24A:
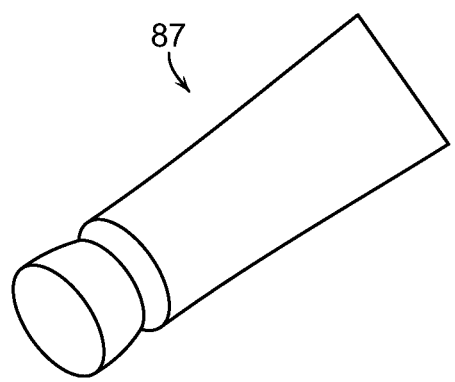
FIGS. 24A and 24B show an illustrative diagrammatic view of a grasp selection process in a storage, retrieval and processing system of the an embodiment of the present invention.
Figure 24B:
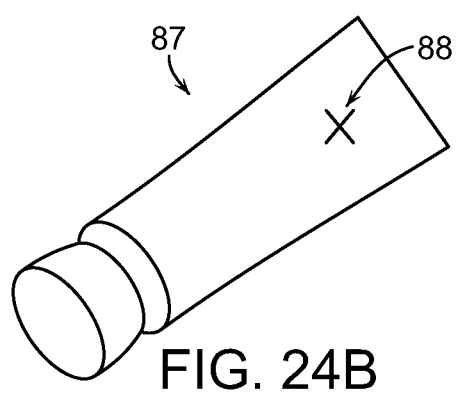

As shown in FIGS. 24A and 24B, the perception system may also identify portions of an object that are the most flat in the generation of good grasp location information. In particular, if an object includes a tubular end and a flat end such as object 87, the system would identify the more flat end as shown at 88 in FIG. 24B. Additionally, the system may select the area of an object where a UPC code appears, as such codes are often printed on a relatively flat portion of the object to facilitate scanning of the barcode.

Figure 25A:
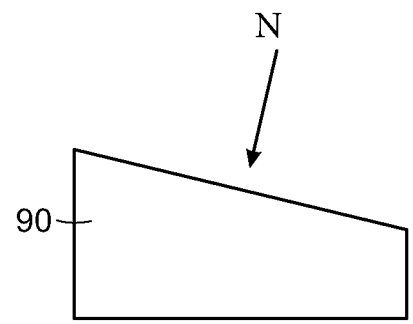
FIGS. 25A and 25B show an illustrative diagrammatic view of a grasp planning process in a storage, retrieval and processing system of the an embodiment of the present invention.
Figure 25B:
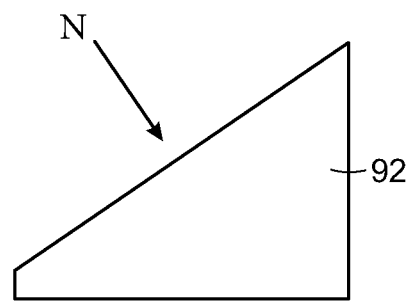
Figure 26A:
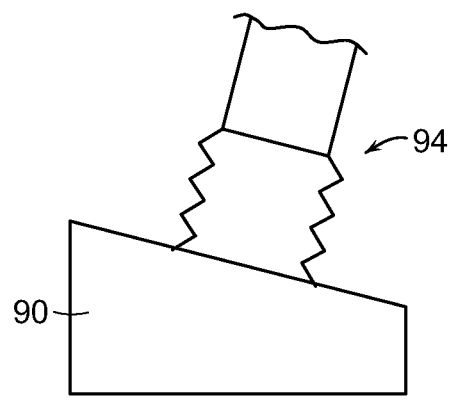
FIGS. 26A and 26B show an illustrative diagrammatic view of a grasp execution process in a storage, retrieval and processing system of the an embodiment of the present invention.
Figure 26B:
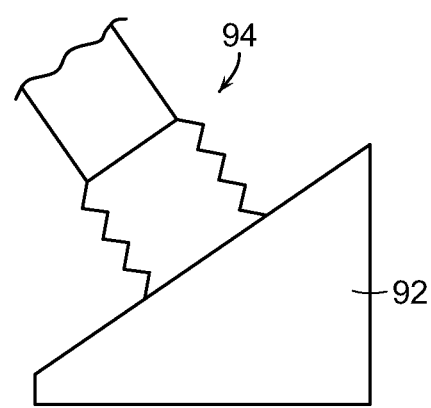

FIGS. 25A and 25B show that for each object 90, 92, the grasp selection system may determine a direction N that is normal to the selected flat portion of the object 90, 92. As shown in FIGS. 26A and 26B, the robotic system will then direct the end effector 94 to approach each object 90, 92 from the direction that is normal to the surface in order to better facilitate the generation of a good grasp on each object. By approaching each object from a direction that is substantially normal to a surface of the object, the robotic system significantly improves the likelihood of obtaining a good grasp of the object, particularly when a vacuum end effector is employed.

The invention provides therefore in certain embodiments that grasp optimization may be based on determination of surface normal, i.e., moving the end effector to be normal to the perceived surface of the object (as opposed to vertical or gantry picks), and that such grasp points may be chosen using fiducial features as grasp points, such as picking on a barcode, given that barcodes are almost always applied to a flat spot on the object.

Figure 27:
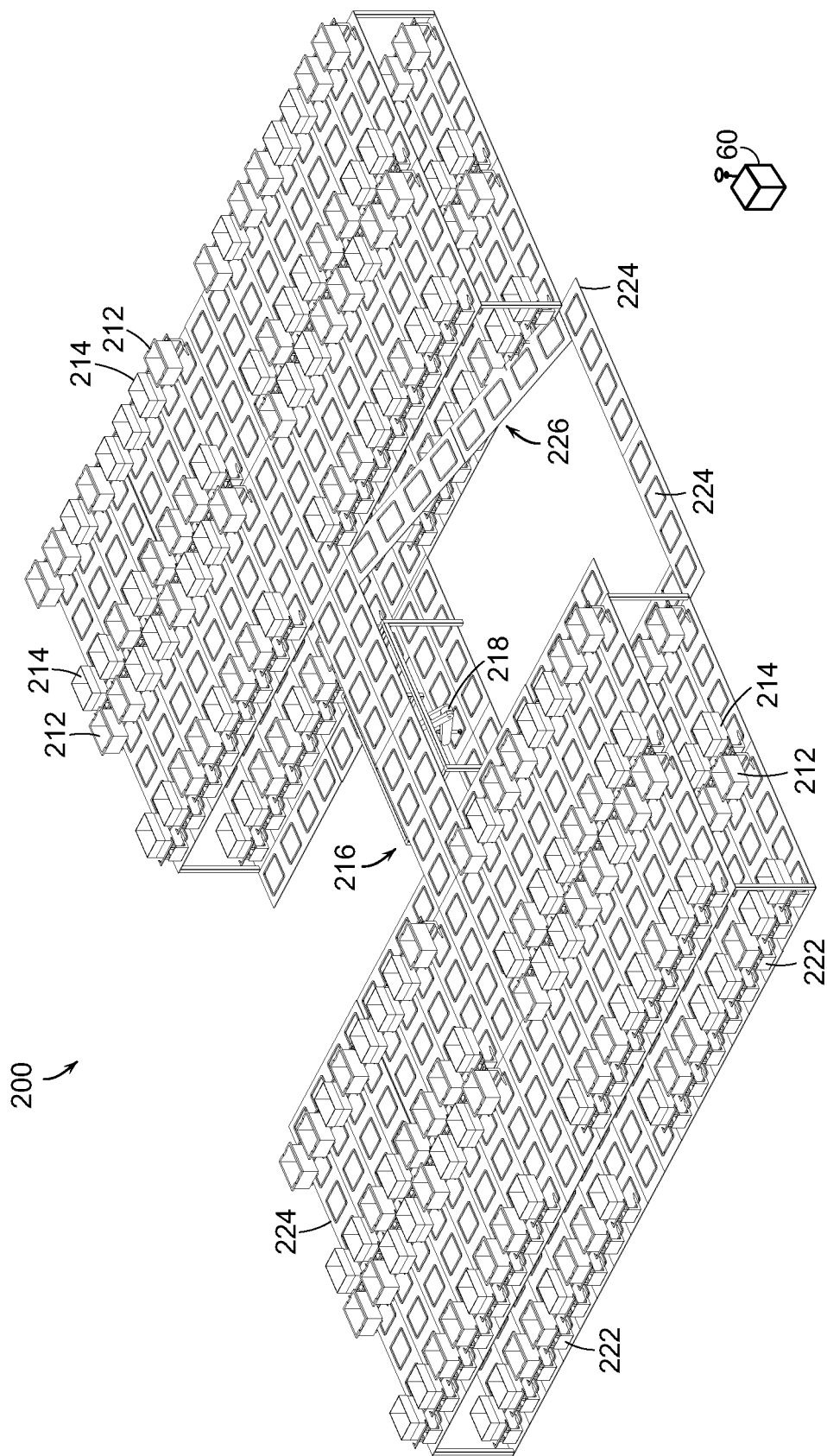
FIG. 27 shows an illustrative diagrammatic view of a storage, retrieval and processing system in accordance with another embodiment of the present invention involving multiple levels of track systems.

With reference to FIG. 27, in accordance with a further embodiment, the invention provides a system 200 that includes a plurality of storage bins 212, a plurality of destination bins 214, and a processing section 216 that includes a programmable motion device 218. The bins 212, 214 are located on shelves 222 that are positioned on track sections 224 as discussed above, but the track sections 224 are provided as two levels of track sections with shelves and bins on both levels. The track sections 224 include ramps 226 that permit the bins to be delivered to and from any of the shelves 220 on either level.

Figure 28:
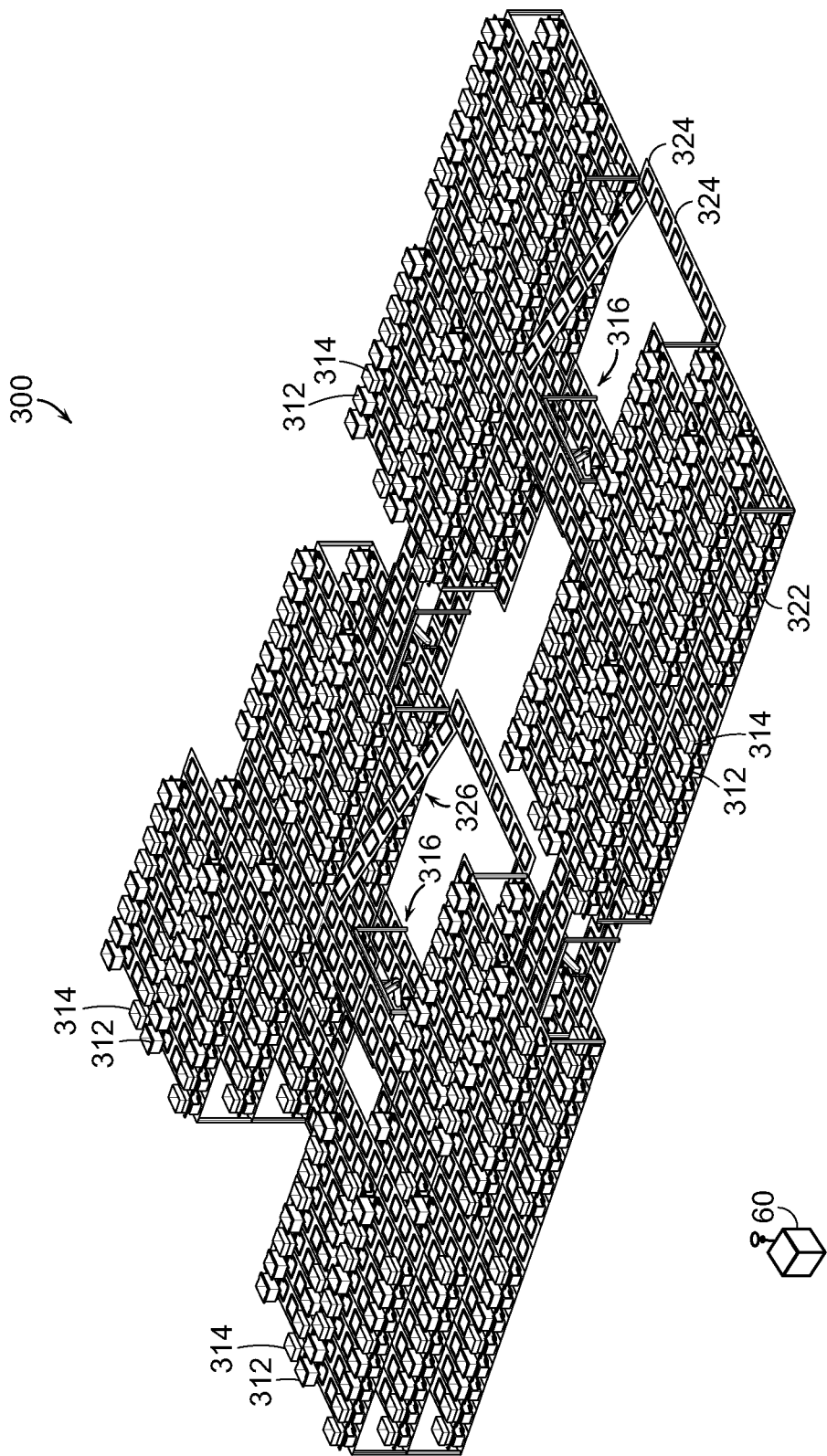
FIG. 28 show an illustrative diagrammatic view of a storage, retrieval and processing system in accordance with a further embodiment of the present invention involving a large number of levels of track systems.

With reference to FIG. 28, in accordance with a further embodiment, the invention provides a system 300 that includes a plurality of storage bins 312, a plurality of destination bins 314, and a plurality of processing sections 316 that each includes a programmable motion device 318. The bins 312, 314 are located on shelves 322 that are positioned on track sections 324 again as discussed above, but the track sections 324 are provided as many levels of track sections with shelves and bins on both levels. The track sections 324 include ramps 326 that permit the bins to be delivered to and from any of the shelves 320 on any level.

Again, the system is programmed to retrieve objects from the selected storage bin(s), and provide them to destination bins in accordance with a manifest. Following processing, the returned storage bin(s) may be returned anywhere in the storage section as long as the system knows where each bin has been returned, and the returned destination bin(s) may be returned anywhere in the storage section as long as the system knows where each bin has been returned.

Control of each of the systems may be provided by the computer system 60 that is in communication with the programmable motion devices as well as the carriers. The computer system 60 also contains the knowledge (continuously updated) of the location and identity of each of the storage bins, and contains the knowledge (also continuously updated) of the location and identity of each of the destination bins. The system therefore, directs the movement of the storage bins and the destination bins, and retrieves objects from the storage bins, and distributes the objects to the destination bins in accordance with an overall manifest that dictates which objects must be provided in which destination boxes for shipment, for example, to distribution or retail locations.

In the systems of the present invention, throughput and storage may scale independently, and all inventory SKUs may reach all outbound containers. The systems are robust to failures due to redundancy, and inventory totes (storage bins) and outbound boxes (destination bins) may be handled interchangeably.

Those skilled in the art will appreciate that numerous modifications and variations may be made to the above disclosed embodiments without departing from the spirit and scope of the present invention.

What is claimed is:

1. A method of providing storage, retrieval and processing of objects, comprising:
 providing a plurality of storage bins for storage of a plurality of objects, said plurality of storage bins being located on a first plurality of shelf locations;
 providing a plurality of destination bins for receiving the plurality of objects, said plurality of destination bins being located on a second plurality of shelf locations;
 removing a selected storage bin from a first shelf of the first plurality of shelves, in part, by moving a first automated mobile cart under the first shelf and moving the selected storage bin onto the first automated mobile cart;
 moving the first automated mobile cart including the selected storage bin to a bin processing location;
 removing a selected destination bin from a second shelf of the second plurality of shelves, in part, by moving a second automated mobile cart under the second shelf and moving the selected destination bin onto the second automated mobile cart;
 moving the second automated mobile cart including the selected destination bin to the bin processing location; and grasping and moving a selected object out of the selected storage bin at the bin processing location to the selected destination bin at the bin processing location using an end effector of a programmable motion device.

2. The method as claimed in claim 1, wherein the plurality of storage bins is provided as an array of storage bins.

3. The method as claimed in claim 1, wherein the plurality of destination bins is provided as an array of destination bins.

4. The method as claimed in claim 1, wherein the plurality of storage bins and the plurality of destination bins are interspersed with one another.

5. The method as claimed in claim 1, wherein the first plurality of shelves is provided as an array.

6. The method as claimed in claim 1, wherein the second plurality of shelves is provided as an array.

7. The method as claimed in claim 1, wherein the first plurality of shelves and the second plurality of shelves are interspersed with one another.

8. The method as claimed in claim 1, wherein the first plurality of shelves and the second plurality of shelves are provided as a third plurality of shelves that are each usable for receiving either the selected storage bin or the selected destination bin.

9. The method as claimed in claim 1, wherein each automated mobile cart is movable in at least two mutually orthogonal directions.

10. The method as claimed in claim 1, further comprising returning the selected storage bin from the storage bin processing location to a further available shelf among the first plurality of shelves by moving the first automated mobile cart under the shelf and moving the selected storage bin onto the further available shelf, and moving the first automated mobile cart away from under the further available shelf.

11. The method as claimed in claim 1, further comprising returning the selected destination bin from the destination bin processing location to a further available shelf by moving the second automated mobile cart under the further available shelf to move the selected destination bin onto the further available shelf and moving the second automated mobile cart away from under the further available shelf.

12. A method of providing storage, retrieval and processing of objects, comprising:
  providing a plurality of storage bins for storage of a plurality of objects, said plurality of storage bins being located on a first plurality of shelf locations;
  providing a plurality of destination bins for receiving the plurality of objects, said plurality of destination bins being located on a second plurality of shelf locations;
  moving a first automated mobile cart including a selected storage bin of the plurality of storage bins to a bin processing location;
  moving a second automated mobile cart including a selected destination bin of the plurality of destination bins to the bin processing location;
  grasping and moving a selected object out of the selected storage bin at the bin processing location to the selected destination bin at the bin processing location using an end effector of a programmable motion device; and
  moving the second automated mobile cart including the selected destination bin from the bin processing location to an available shelf among the first plurality of shelves and the second plurality of shelves, in part, by moving the second automated mobile cart under the available shelf and moving the selected destination bin onto the available shelf.

13. The method as claimed in clam 12, wherein the method further includes removing a selected storage bin from a first shelf of the first plurality of shelves, in part, by moving the first automated mobile cart under the first shelf and moving the selected storage bin onto the first automated mobile cart.

14. The method as claimed in clam 12, wherein the method further includes removing a selected destination bin from a second shelf of the second plurality of shelves, in part, by moving the second automated mobile cart under the second shelf and moving the selected destination bin onto the second automated mobile cart.

15. The method as claimed in claim 12, wherein the plurality of storage bins is provided as an array of storage bins.

16. The method as claimed in claim 12, wherein the plurality of destination bins is provided as an array of destination bins.

17. The method as claimed in claim 12, wherein the plurality of storage bins and the plurality of destination bins are interspersed with one another.

18. The method as claimed in claim 12, wherein the first plurality of shelves is provided as an array.

19. The method as claimed in claim 12, wherein the second plurality of shelves is provided as an array.

20. The method as claimed in claim 12, wherein the first plurality of shelves and the second plurality of shelves are interspersed with one another.

21. The method as claimed in claim 12, wherein the first plurality of shelves and the second plurality of shelves are provided as a third plurality of shelves that are each usable for receiving either the selected storage bin or the selected destination bin.

22. The method as claimed in claim 12, wherein each automated mobile cart is movable in at least two mutually orthogonal directions.

23. The method as claimed in claim 12, further comprising returning the selected storage bin from the storage bin processing location to a further available shelf among the first plurality of shelves by moving the first automated mobile cart under the shelf and moving the selected storage bin onto the further available shelf, and moving the first automated mobile cart away from under the further available shelf.

24. A storage, retrieval and processing system for processing objects, said storage, retrieval and processing system comprising:
  a plurality of storage bins providing storage of a plurality of objects, and a plurality of destination bins for receiving any of the plurality of objects, both said plurality of storage bins and said plurality of destination bins being provided interspersed with one another on a plurality of shelf locations, said plurality of shelf locations being in communication with a bin conveyance system including a first mobile cart and a second mobile cart;
  the first mobile cart for moving under a first location of the plurality of shelf locations for acquiring a selected storage bin onto the first mobile cart;
  the second mobile cart for moving under a second location of the plurality of shelf locations for acquiring a selected destination bin onto the second mobile cart; and
  a programmable motion device in communication with the bin processing location for receiving the selected storage bin on the first mobile cart, and for receiving the selected destination bin on the second mobile cart, said programmable motion device including an end effector for grasping and moving a selected object out of the selected storage bin and to the selected destination bin at the bin processing location.

25. The storage, retrieval and processing system as claimed in claim 24, wherein the first mobile cart removes the selected storage bin from a respective shelf by moving under the shelf and subsequently moving away from under the shelf with the selected storage bin on the mobile cart.

26. The storage, retrieval and processing system as claimed in claim 24, wherein the second mobile cart removes the selected destination bin from a respective shelf by moving under the shelf and subsequently moving away from under the shelf with the selected destination bin on the mobile cart.

27. The storage, retrieval and processing system as claimed in claim 24, wherein the plurality of storage bins and the plurality of destination bins are interspersed with one another as an array.

28. The storage, retrieval and processing system as claimed in claim 24, wherein the processing programmable motion device includes an articulated arm, and wherein the articulated arm is positioned adjacent a portion of the bin conveyance system.

29. The storage, retrieval and processing system as claimed in claim 24, wherein the second mobile cart is adapted to move the selected destination bin away from the bin processing location proximate the processing programmable motion device.

30. The storage, retrieval and processing system as claimed in claim 24, wherein the bin conveyance system further includes a plurality of track sections.

31. The storage, retrieval and processing system as claimed in claim 30, wherein the first mobile cart and the second mobile cart are movable in at least two mutually orthogonal directions on the plurality of track sections.

32. The storage, retrieval and processing system as claimed in claim 30, wherein each of the plurality of shelf locations may receive any of a shelved storage bin of the plurality of storage bins and a shelved destination bin of the plurality of destination bins.

* * * * *